United States Patent
Matsunaga

(10) Patent No.: US 10,436,442 B2
(45) Date of Patent: Oct. 8, 2019

(54) EXHAUST TUBE HOLDING MEMBER, EXHAUST STRUCTURE FOR COMBUSTION APPARATUS, AND METHOD FOR INSTALLING EXHAUST STRUCTURE FOR COMBUSTION APPARATUS

(71) Applicant: NORITZ CORPORATION, Hyogo (JP)

(72) Inventor: Hironao Matsunaga, Amagasaki (JP)

(73) Assignee: NORITZ CORPORATION, Hyogo (JP)

( * ) Notice: Subject to any disclaimer, the term of this patent is extended or adjusted under 35 U.S.C. 154(b) by 468 days.

(21) Appl. No.: 14/925,567

(22) Filed: Oct. 28, 2015

(65) Prior Publication Data

US 2017/0122556 A1    May 4, 2017

(51) Int. Cl.
    *F23J 13/02*      (2006.01)
    *F16L 5/10*       (2006.01)

(52) U.S. Cl.
    CPC ............. *F23J 13/025* (2013.01); *F23J 13/02* (2013.01); *F16L 5/10* (2013.01); *F23J 2213/101* (2013.01)

(58) Field of Classification Search
    CPC ...... F23J 13/025; F23J 13/02; F23J 2216/101; F23J 13/04; F16L 3/003; F16L 5/10; F16L 21/007; F16L 21/06; F16L 25/04; F16L 33/035; F16L 33/23; F16L 33/222;
    (Continued)

(56) References Cited

U.S. PATENT DOCUMENTS

| | | | | |
|---|---|---|---|---|
| 2,176,513 A | * | 10/1939 | Smith | B65D 47/2031 |
| | | | | 222/490 |
| 2,275,902 A | * | 3/1942 | Hasenburger | F16L 7/00 |
| | | | | 126/307 R |
| 2,510,926 A | | 6/1950 | Goldstein | |

(Continued)

FOREIGN PATENT DOCUMENTS

| | | | | |
|---|---|---|---|---|
| DE | 3935531 C1 | * | 11/1990 | .............. F16L 5/02 |
| EP | 0427598 B1 | * | 3/1993 | .............. F16L 59/12 |

(Continued)

OTHER PUBLICATIONS

An Office Action issued by the U.S. Patent Office dated Aug. 17, 2015, which corresponds to Design U.S. Appl. No. 29/492,341 and is related to U.S. Appl. No. 14/925,567.

(Continued)

*Primary Examiner* — Gregory L Huson
*Assistant Examiner* — Frances F. Hamilton
(74) *Attorney, Agent, or Firm* — Studebaker & Brackett PC

(57) ABSTRACT

An exhaust tube holding member for holding an exhaust tube inside an exhaust pipe includes a main body. The exhaust tube is connected to a combustion apparatus and introduced into the exhaust pipe. The main body includes a first surface and a second surface opposing each other, and a rim surrounding the periphery of the first surface and the second surface. The main body is provided with an exhaust tube holding hole and an exhaust tube inserting notch. The exhaust tube holding hole is configured to penetrate the main body from the first surface to the second surface. The exhaust tube inserting notch is configured to penetrate the main body from the first surface to the second surface and extend from the exhaust tube holding hole to the rim.

16 Claims, 15 Drawing Sheets

(58) Field of Classification Search
CPC ....... F16L 33/227; F16L 37/08; F16L 37/105; F16L 37/113
USPC .............. 454/44; 248/60; 138/106, 112
See application file for complete search history.

(56) References Cited

U.S. PATENT DOCUMENTS

| | | | | |
|---|---|---|---|---|
| 2,679,867 A * | 6/1954 | Epstein | ............... | F16L 37/02 126/307 R |
| 2,898,839 A * | 8/1959 | McKann | ............. | E04D 13/1476 126/307 R |
| 2,910,308 A * | 10/1959 | Carr | .................. | F16L 37/084 285/123.16 |
| 3,046,028 A | 7/1962 | Nathan | | |
| 3,208,914 A | 9/1965 | Dickson | | |
| 3,306,109 A | 2/1967 | Caparone | | |
| 3,414,273 A | 12/1968 | Sumner | | |
| 3,761,114 A * | 9/1973 | Blakeley | ............... | F16L 23/02 24/517 |
| 3,913,928 A | 10/1975 | Yamaguchi | | |
| 4,115,961 A | 9/1978 | Bishop | | |
| 4,293,138 A | 10/1981 | Swantee | | |
| 4,306,491 A * | 12/1981 | Reardon, Jr. | .......... | F23J 13/025 126/280 |
| 4,407,023 A * | 10/1983 | Norton | ................... | E03C 1/042 137/359 |
| 4,608,963 A * | 9/1986 | Townsend | .............. | F23J 13/025 126/307 R |
| 4,781,402 A * | 11/1988 | Ream | ................... | F16L 39/005 285/123.16 |
| 4,844,274 A | 7/1989 | Sterk | | |
| 4,846,147 A * | 7/1989 | Townsend | ................ | F23J 13/02 126/307 R |
| 5,067,751 A | 11/1991 | Walworth et al. | | |
| 5,158,328 A * | 10/1992 | Anderson | ............... | D06F 58/20 285/144.1 |
| 5,160,179 A * | 11/1992 | Takagi | ................ | F16L 37/0915 285/313 |
| 5,390,967 A | 2/1995 | Gooderham et al. | | |
| 5,482,076 A | 1/1996 | Taylor et al. | | |
| 5,634,673 A * | 6/1997 | Miyazaki | ............. | F16L 37/0847 285/148.5 |
| 6,065,779 A * | 5/2000 | Moner | ................... | B25B 27/10 285/23 |
| 6,076,862 A | 6/2000 | Barth et al. | | |
| 6,079,753 A * | 6/2000 | Erwin | ................. | F01N 13/1805 285/328 |
| 6,085,795 A * | 7/2000 | Ogawa | ................ | B60R 16/0222 138/108 |
| 6,312,021 B1 * | 11/2001 | Thomas | .............. | F16L 25/0036 285/226 |
| 6,367,849 B1 * | 4/2002 | Tatsuta | .................... | F16L 21/06 285/373 |
| 6,595,471 B1 * | 7/2003 | Botting | ..................... | F16L 3/02 248/339 |
| 6,595,473 B2 * | 7/2003 | Aoki | ........................ | F16L 3/10 138/108 |
| 6,612,623 B2 * | 9/2003 | Salomon-Bahls | ......................... | F16L 37/0915 285/308 |
| 6,685,144 B1 * | 2/2004 | Wochnick | ............. | F16L 3/085 248/60 |
| 7,219,931 B2 * | 5/2007 | Kato | .................. | B60R 16/0207 248/60 |
| D639,653 S * | 6/2011 | Kanda | ............................ | D9/434 |
| 7,992,526 B2 | 8/2011 | Ritsema et al. | | |
| 8,281,800 B2 * | 10/2012 | Ball | ........................ | E03C 1/042 137/359 |
| 8,322,755 B2 * | 12/2012 | Kluss | .................. | F16L 37/0915 285/314 |
| 8,596,226 B2 | 12/2013 | McAnally et al. | | |
| 8,616,505 B2 * | 12/2013 | Gates | ..................... | F16M 13/02 211/124 |
| D704,043 S * | 5/2014 | Gledhill | ........................ | D8/396 |
| 8,984,822 B1 * | 3/2015 | Cline | .................. | E04D 13/1476 52/244 |
| 9,068,680 B1 * | 6/2015 | Crompton | ............. | F16L 37/091 |
| 9,315,163 B2 * | 4/2016 | Nagayasu | ............ | H02G 3/0691 |
| D770,872 S * | 11/2016 | Gledhill | ............................ | D8/17 |
| D801,494 S * | 10/2017 | Matsunaga | .................. | D23/322 |
| 9,777,875 B2 * | 10/2017 | Bobo | ..................... | F16L 37/091 |
| D810,902 S * | 2/2018 | Matsunaga | .................. | D23/322 |
| 2009/0127802 A1 * | 5/2009 | May | ........................ | F16L 5/10 277/606 |
| 2009/0235875 A1 | 9/2009 | Gordon et al. | | |
| 2009/0301406 A1 | 12/2009 | Ritsema et al. | | |
| 2010/0044970 A1 | 2/2010 | Suzuki et al. | | |
| 2010/0269943 A1 | 10/2010 | Arai | | |
| 2010/0294895 A1 * | 11/2010 | Heath | .................... | F16L 3/1207 248/60 |
| 2011/0074149 A1 | 3/2011 | Matsui et al. | | |
| 2011/0240143 A1 | 10/2011 | Lang et al. | | |
| 2012/0272928 A1 | 11/2012 | Kameyama | | |
| 2012/0323221 A1 | 12/2012 | Gallo et al. | | |
| 2014/0232102 A1 * | 8/2014 | Yu | ........................... | F04B 15/02 285/46 |
| 2014/0367527 A1 * | 12/2014 | Anderson | ............... | F16L 3/133 248/60 |
| 2015/0056903 A1 | 2/2015 | Nagano et al. | | |
| 2015/0219000 A1 | 8/2015 | Nojiri | | |
| 2016/0146386 A1 * | 5/2016 | Blake | ................. | A61M 39/1011 285/45 |

FOREIGN PATENT DOCUMENTS

| | | | | |
|---|---|---|---|---|
| EP | 0427598 B1 * | 3/1993 | .............. | F16L 59/12 |
| FR | 2803896 A1 * | 7/2001 | ................ | F16L 7/00 |
| GB | 2226392 B * | 11/1992 | .............. | E04F 17/02 |
| JP | S61-007424 Y2 | 3/1986 | | |
| JP | H01-189410 A | 7/1989 | | |
| JP | H05-023945 Y2 | 6/1993 | | |
| JP | 2000-179750 A | 6/2000 | | |
| JP | 2006-349327 A | 12/2006 | | |
| JP | 2009-281057 A | 12/2009 | | |
| JP | 2014218163 A * | 11/2014 | ......... | B60H 1/00021 |

OTHER PUBLICATIONS

An Office Action issued by the U.S. Patent Office dated Mar. 9, 2017, which corresponds to U.S. Appl. No. 14/291,418 and is related to U.S. Appl. No. 14/925,567.

An Office Action issued by the U.S. Patent Office dated Oct. 10, 2017, which corresponds to U.S. Appl. No. 15/406,300 and is related to U.S. Appl. No. 14/925,567.

An Office Action issued by the U.S. Patent Office dated Aug. 18, 2017, which corresponds to U.S. Appl. No. 14/291,418 and is related to U.S. Appl. No. 14/925,567.

An Office Action issued by the United States Patent Office dated May 9, 2018, which corresponds to U.S. Appl. No. 15/406,300 and is related to U.S. Appl. No. 14/925,567.

An Advisory Action issued by the U.S. Patent and Trademark Office dated Aug. 28, 2018, which corresponds to U.S. Appl. No. 15/406,300 and is related to U.S. Appl. No. 14/925,567.

* cited by examiner

EXHAUST TUBE HOLDING MEMBER, EXHAUST STRUCTURE FOR COMBUSTION APPARATUS, AND METHOD FOR INSTALLING EXHAUST STRUCTURE FOR COMBUSTION APPARATUS

BACKGROUND OF THE INVENTION

Field of the Invention

The present invention relates to an exhaust tube holding member, an exhaust structure for combustion apparatus, and a method for installing an exhaust structure for combustion apparatus.

Description of the Background Art

A combustion apparatus such as a water heater or a room heater is disposed in such a manner that a main body thereof is installed indoors, and an exhaust gas therefrom is discharged to the outside through an exhaust pipe. When replacing such a combustion apparatus (for example, a tank water heater) already installed in a building with a new combustion apparatus (for example, an instantaneous water heater), the replacement may encounter such a situation where the outer appearance of a building must be reserved or a situation where the outer appearance thereof can be changed.

In a situation where the outer appearance of a building must be reserved, it is required to reuse the already installed rain cap (exhaust terminal). In such situation, it is possible to perform the installation by using an exhaust adapter disclosed in US2015/0056903A1. On the other hand, in a situation where the outer appearance of the building can be changed, it is possible to replace the already installed rain cap, which makes the installation simple.

SUMMARY OF THE INVENTION

The present invention has been accomplished in view of the aforementioned problems, and it is therefore an object of the present invention to provide an exhaust tube holding member, an exhaust structure for combustion apparatus and a method for installing an exhaust structure for combustion apparatus, which allows an easier installation in a situation where the outer appearance of a building can be changed.

The exhaust tube holding member of the present invention is configured for holding an exhaust tube which is connected to a combustion apparatus and introduced into an exhaust pipe inside the exhaust pipe. The exhaust tube holding member includes a main body. The main body includes a first surface and a second surface opposing each other, and a rim surrounding the periphery of the first surface and the second surface. The main body is provided with an exhaust tube holding hole and an exhaust tube inserting notch. The exhaust tube holding hole is configured to penetrate the main body from the first surface to the second surface. The exhaust tube inserting notch is configured to penetrate the main body from the first surface to the second surface and extend from the exhaust tube holding hole to the rim.

According to the exhaust tube holding member of present invention, it is possible to insert the exhaust tube into the exhaust tube holding hole from the exhaust tube inserting notch which is opened to the rim. As a result, it is possible to attach the exhaust tube holding member to the exhaust tube along the radial direction of the exhaust tube, compared with the case of attaching the exhaust tube holding member along the axial direction of the exhaust tube, it is possible to facilitate the installation.

In the exhaust tube holding member mentioned above, the main body has a width smaller than the width of the exhaust tube inserting notch at a boundary portion between the exhaust tube holding hole and the exhaust tube inserting notch. As a result, once after the exhaust tube is inserted into the exhaust tube holding hole, the exhaust tube is prevented from slipping out from the exhaust tube holding hole back to exhaust tube inserting notch.

In the exhaust tube holding member mentioned above, an exhaust tube holding portion having projection and recess portions matching the shape of the outer peripheral surface of the exhaust tube is formed on a wall surface defining the exhaust tube holding hole, and an exhaust tube inserting portion having projection and recess portions matching the shape of the outer peripheral surface of the exhaust tube is formed on a wall surface defining the exhaust tube inserting notch. As a result, after the exhaust tube is inserted into the exhaust tube holding hole, the exhaust tube holding portion fits a recess and a projection formed on the outer peripheral surface of the exhaust tube. Thereby, the exhaust tube holding member is prevented from moving in the axial direction relative to the exhaust tube.

Because each of the exhaust tube holding portion and the exhaust tube inserting portion include projection and recess parts, as described herein, each of the exhaust tube holding portion and the exhaust tube inserting portion can be described as an exhaust tube projection and recess portion and an exhaust tube inserting projection and recess portion.

In the exhaust tube holding member mentioned above, the exhaust tube holding projection and recess portion includes a holding recess part, a first holding projection part positioned at one side of the holding recess part, and a second holding projection part positioned at the other side of the holding recess part. The first holding projection part is divided by a plurality of first cutouts into a plurality of first projection strips, and the second holding projection part is divided by a plurality of second cutouts into a plurality of second projection strips. Each second cutout is located at the other side of each of the plurality of first projection strips, and each first cutout is located at the one side of each of the plurality of second projection strips. The exhaust tube inserting projection and recess portion includes an inserting recess part, a first inserting projection part positioned at one side of the inserting recess part, and a second inserting projection part positioned at the other side of the inserting recess part. The first inserting projection part is divided by a plurality of third cutouts into a plurality of third projection strips, and the second inserting projection part is divided by a plurality of fourth cutouts into a plurality of fourth projection strips. Each fourth cutout is located at the other side of each of the plurality of third projection strips, and each third cutout is located at the one side of each of the plurality of fourth projection strips. As a result, when the exhaust tube holding member is molded by using a molding die, it is possible to mold it by using a molding die positioned at the side of the first surface and a molding die positioned at the side of the second surface. Thereby, it is possible to simplify the structure of the molding die.

In the exhaust tube holding member mentioned above, the exhaust tube holding projection and recess portion includes a holding recess part, and a holding projection part positioned at one side of the holding recess part, and the exhaust tube inserting projection and recess portion includes an inserting recess part, and an inserting projection part positioned at one side of the inserting recess part. The exhaust tube holding projection and recess portion includes no other projection part except the single holding projection part, and the exhaust tube inserting projection and recess portion includes no other projection part except the single inserting projection part. As a result, when the exhaust tube holding member is molded by using a molding die, it is possible to mold it by using a molding die positioned at the side of the first surface and a molding die positioned at the side of the second surface. Thereby, it is possible to simplify the structure of the molding die.

In the exhaust tube holding member mentioned above, an exhaust tube inserting projection and recess portion matching the shape of the outer peripheral surface of the exhaust tube is formed on a wall surface defining the exhaust tube inserting notch. As a result, when passing the exhaust tube through the exhaust tube inserting notch, the exhaust tube holding member is properly guided in the radial direction of the exhaust tube by the exhaust tube inserting projection and recess portion. Thereby, it is possible to make the operation of attaching the exhaust tube holding member to the exhaust tube easier.

In the exhaust tube holding member mentioned above, the exhaust tube inserting projection and recess portion includes an inserting recess part, a first inserting projection part positioned on one side of the inserting recess part, and a second inserting projection part positioned on the other side of the inserting recess part. The first inserting projection part extends to the side of the rim further than the second inserting projection part. As a result, when outfitting the opening of the exhaust tube inserting notch onto the outer peripheral surface of the exhaust tube, the first inserting projection part can be placed on a projection formed on the outer peripheral surface of the exhaust tube. The placement of the first inserting projection part on a projection formed on the outer peripheral surface of the exhaust tube allows the exhaust tube holding member to be positioned relative to the exhaust tube in the axial direction.

Then, after the exhaust tube is inserted into the exhaust tube inserting notch, the projection on the outer peripheral surface of the exhaust tube can be sandwiched between the first inserting projection part and the second inserting projection part, and held by the both. Thereby, it is possible to attach the exhaust tube holding member to the exhaust tube while preventing the exhaust tube holding member from displacing from the exhaust tube axially, making the operation of attaching the exhaust tube holding member to the exhaust tube easier.

In the exhaust tube holding member mentioned above, the main body is provided with a positioning protrusion protruding from the second surface in conformity with the shape of an upper end opening of the exhaust pipe. With the help of the positioning protrusion, it is possible to position the exhaust tube holding member relative to the upper end opening of the exhaust pipe and prevent the exhaust tube holding member from displacing from the upper end opening of the exhaust pipe.

In the exhaust tube support member, the positioning protrusion has an arc shape. As a result, in the case where the upper end opening of the exhaust pipe is circular, it is possible to make the positioning protrusion follow the shape of the upper end opening of the exhaust pipe.

In the exhaust tube holding member mentioned above, the positioning protrusion positioning protrusion is provided to surround the periphery of the exhaust tube holding hole without reaching the exhaust tube inserting notch. As a result, when fitting the exhaust tube into the opening ends of the exhaust tube inserting notch at the rim, the positioning protrusion is prevented from interfering with the upper end opening of the exhaust pipe. Therefore, it is possible to attach the exhaust tube holding member to the exhaust tube more smoothly.

In the exhaust tube holding member mentioned above, the main body is provided with a positioning recess arranged on the second surface and configured to contact the upper end opening of the exhaust pipe. With the help of the positioning recess, it is possible to position the exhaust tube holding member relative to the upper end opening of the exhaust pipe and prevent the exhaust tube holding member from displacing from the upper end opening of the exhaust pipe.

In the exhaust tube holding member mentioned above, the main body is provided with a reinforcing rib protruding from the first surface and extending from the exhaust tube holding hole to the rim. With the help of the reinforcing rib, it is possible to improve the strength of the outer periphery around the exhaust tube holding hole, allowing the exhaust tube holding member to hold the exhaust tube securely.

In addition, no reinforcing rib is provided around the exhaust tube inserting notch. As a result, it is possible to make the main body around the exhaust tube inserting notch flexible. Therefore, when inserting the exhaust tube into the exhaust tube inserting notch, the main body around the exhaust tube inserting notch bends in accordance with the shape of the outer peripheral surface of the exhaust tube, making the attachment of the exhaust tube holding member to the exhaust tube easier.

In the exhaust tube holding member mentioned above, the exhaust tube holding hole has a circular shape when viewed from a direction orthogonal to the first surface. The width of the exhaust tube inserting notch is equal to the diameter of the exhaust tube holding hole. As a result, it is easy to design the exhaust tube holding member.

The exhaust tube holding member mentioned above is further provided with a blockage plate configured to be held by the main body after being inserted into the exhaust tube inserting notch. The blockage plate is inserted into the exhaust tube inserting notch in a state where the exhaust tube is held inside exhaust tube holding hole. Thereby, it is possible to use the blockage plate to block the exhaust tube inserting notch, and it is possible to use the exhaust tube holding member to block the upper end opening of the exhaust pipe. Thus, the outside cool air can be prevented from entering the exhaust pipe through the upper end opening of the exhaust pipe. As a result, in the case where the outer temperature is low, the outside cool air can be prevented from entering the exhaust pipe to generate condensation water on the inner surface of the exhaust pipe, and thereby preventing the walls and the roof inside the room from getting wet by the condensation water.

An exhaust structure for combustion apparatus of the present invention is provided with an exhaust tube holding member, an exhaust tube, an exhaust pipe, and a rain cap. The exhaust tube holding member is any one of the exhaust tube holding member mentioned above. The exhaust tube has one end and the other end, and is connected to the combustion apparatus at the one end. The exhaust tube is introduced inside the exhaust pipe. The rain cap is connected to the other end of the exhaust tube, and is configured to cover the upper side of the exhaust tube holding member. The exhaust tube holding member is attached to the outer peripheral surface of the exhaust tube and is held at the upper end of the exhaust pipe.

According to the exhaust structure for combustion apparatus of the present invention, it is possible to insert the exhaust tube into the exhaust tube holding hole from the exhaust tube inserting notch which is opened to the rim. As a result, it is possible to attach the exhaust tube holding member to the exhaust tube along the radial direction of the exhaust tube, compared with the case of attaching the exhaust tube holding member along the axial direction of the exhaust tube, it is possible to facilitate the installation of the exhaust tube inside the exhaust pipe.

In the state where the exhaust tube holding member is held at the upper end of the exhaust pipe, the exhaust tube inserting notch communicates an internal space of the exhaust pipe with an external space of the exhaust pipe. As a result, even if the exhaust gas leaks from the interior of the exhaust tube to the outside, it is possible to discharge the exhaust gas from the interior of the exhaust pipe through the exhaust tube inserting notch to the outside of the exhaust pipe. Therefore, the exhaust gas is discharged to the outside and is prevented from entering into the room.

Furthermore, the rain cap is configured to cover the upper side of the exhaust tube holding member. Therefore, it is possible to prevent the moisture such as rain water from entering into the exhaust pipe through the exhaust tube inserting notch of the exhaust tube holding member.

In the combustion apparatus exhaust structure mentioned above, the rain cap includes a discharge portion for discharging exhaust gas from the combustion apparatus and a cover portion for covering the exhaust tube holding member. The cover portion includes a ceiling having a larger outer diameter than the exhaust tube holding member, and a peripheral wall extending from the ceiling lower than the exhaust tube holding member. As a result, it is possible to discharge the exhaust gas from the combustion apparatus to the outside through the discharge portion of the rain cap. Moreover, since the exhaust tube holding member is covered by the cover portion, it is possible to prevent the moisture such as rain water from entering into the exhaust pipe through the exhaust tube inserting notch of the exhaust tube holding member.

A method of installing an exhaust structure for combustion apparatus of the present invention includes the following steps so as to install the exhaust structure for combustion apparatus by using the exhaust tube holding member mentioned above.

Firstly, the exhaust tube, which has one end and the other end, is connected to the combustion apparatus at the one end, and the other end of the exhaust tube is pulled through the exhaust pipe out of an upper end opening of the exhaust pipe. Then, the exhaust tube holding member is attached to the outer peripheral surface of the exhaust tube protruding from the upper end opening of the exhaust pipe along the radial direction of the exhaust tube so as to insert the exhaust tube into the exhaust tube holding hole through the exhaust tube inserting notch of the exhaust tube holding member. Subsequently, the exhaust tube holding member which has been attached to the outer peripheral surface of the exhaust tube is held against the upper end opening of the exhaust pipe.

According to the method of installing an exhaust structure for combustion apparatus of the present invention, it is possible to insert the exhaust tube into the exhaust tube holding hole from the exhaust tube inserting notch which is opened to the rim. As a result, it is possible to attach the exhaust tube holding member to the exhaust tube along the radial direction of the exhaust tube, compared with the case of attaching the exhaust tube holding member along the axial direction of the exhaust tube, it is possible to facilitate the installation of the exhaust tube inside the exhaust pipe.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Hereinafter, embodiments of the present invention will be described with reference to the drawings.

First, an exhaust structure for combustion apparatus according to an embodiment of the present invention will be described.

Figure 1:
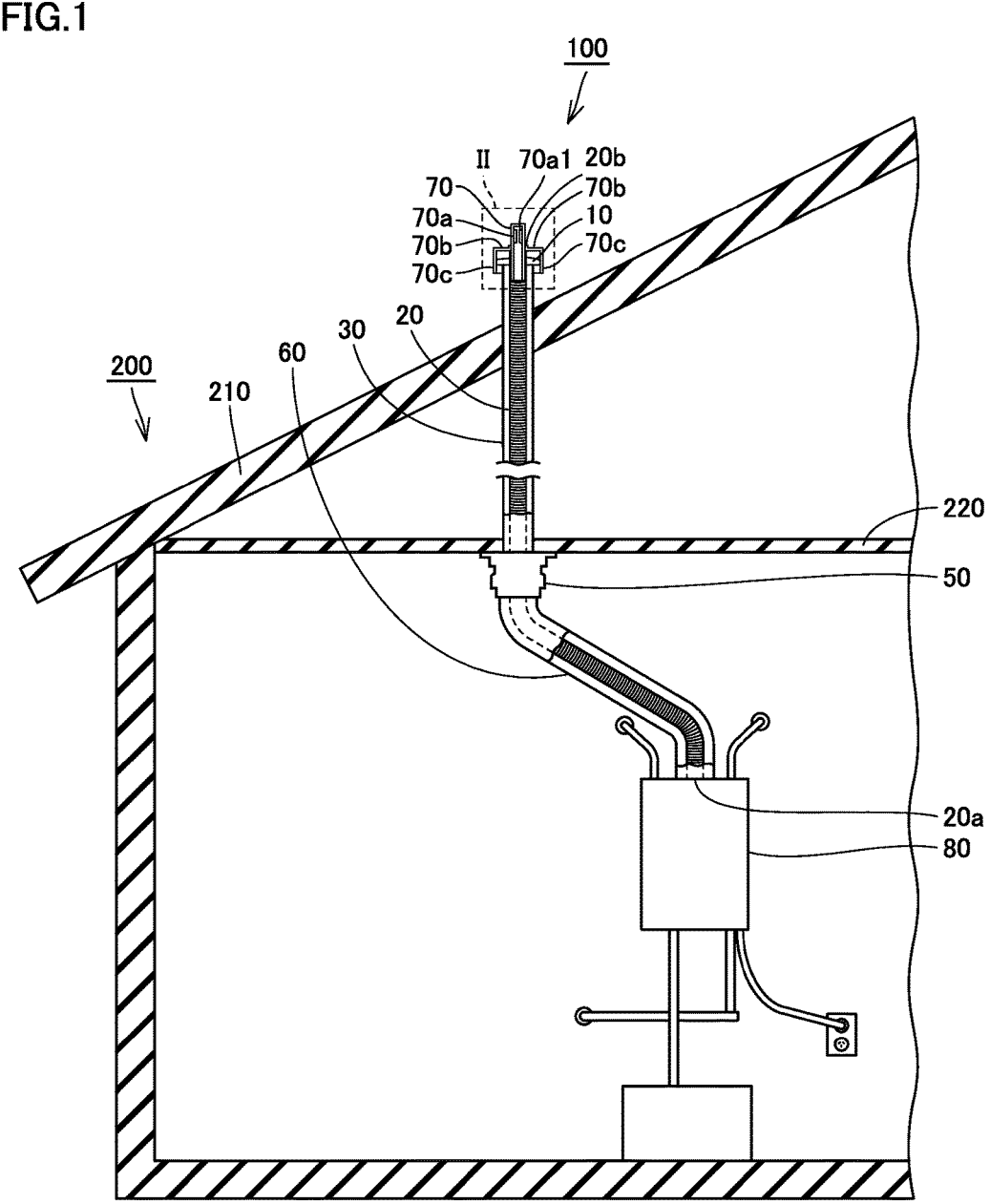
FIG. 1 is a diagram schematically illustrating an exhaust structure for combustion apparatus which has been installed in a building according to an embodiment of the present invention.

As illustrated in FIG. 1, an exhaust structure for combustion apparatus 100 of the present embodiment generally includes a combustion apparatus 80, an exhaust tube holding member 10, an exhaust tube (flexible exhaust pipe) 20, an exhaust pipe (B-vent) 30, an exhaust tube fixing member 50, a connection pipe 60, and a rain cap (exhaust terminal) 70. Exhaust structure for combustion apparatus 100 is configured to discharge a combustion gas generated by combustion apparatus 80 to the outside of a building 200.

Combustion apparatus 80 is installed inside building 200. Combustion apparatus 80 may be a water heater for heating water to hot by combusting a fuel gas or may be any other combustion apparatus such as a room heater for warming up a room by combusting a fuel gas. In the case where a water heater is used as combustion apparatus 80, the water heater may be a water heater adapted to an exhaust suction and combustion system or may be a water heater of a latent heat recovery type.

Exhaust tube 20 has an end 20a and the other end 20b. Exhaust tube 20 is connected to combustion apparatus 80 at one end 20a. The other end 20b of exhaust tube 20 extends out to the outside of the building. The interior of exhaust tube 20 forms a discharge path for discharging the exhaust gas generated from combustion in combustion apparatus 80 to the outside. Thus, the exhaust gas produced by combustion apparatus 80 can be guided to the outside through exhaust tube 20.

Exhaust tube 20 is described as a flexible pipe such as an accordion pipe, it may be a spiral pipe as well. Thereby, it is possible for exhaust tube 20 to follow the shape of exhaust pipe 30 even it is complicated. Based on the fact that the exhaust gas will pass through the interior of exhaust tube 20, it is preferred that exhaust tube 20 is made from a material having acid resistance. As described in the present embodiment, in the case where combustion apparatus 80 is a water heater of a latent heat recovery type, the exhaust gas may be discharged together with acidic drainage water.

Thus, the material of exhaust tube 20 may be selected from materials having acid resistance such as phenol resin, epoxy resin, silicone resin, fluorine resin such as tetrafluoroethylene, unsaturated polyester resin, melamine resin, polycarbonate resin, methacryl styrene (MS) resin, methacryl resin, styrene acrylonitrile copolymer (AS) resin, ABS resin, polyethylene, polypropylene, polystyrene, polyethylene terephthalate (PET), and vinyl chloride resin.

Exhaust pipe 30 is attached to building 200 so as to extend from the indoor to the outdoor through a roof 210 of building 200, for example. Exhaust pipe 30 may extend from the indoor to the outdoor through a wall of the building. Exhaust pipe 30 has a larger diameter than exhaust tube 20, and a part of exhaust tube 20 closer to the other end 20b is inserted inside exhaust pipe 30. Exhaust pipe 30 is made of metal, for example. Exhaust pipe 30 has a cross section (orthogonal to the axis direction of exhaust pipe 30) having a circular shape or an elliptical shape, for example. Exhaust pipe 30 is connected to exhaust tube fixing member 50 at the lower end. Note that exhaust pipe 30 is not required to be connected to exhaust tube fixing member 50.

Exhaust tube fixing member 50 is configured to fix exhaust tube 20 relative to exhaust pipe 30. In the case where exhaust tube fixing member 50 is connected to exhaust pipe 30, exhaust tube fixing member 50 is configured to fix exhaust tube 20 relative to exhaust pipe 30. In the present embodiment, exhaust tube fixing member 50 is attached to exhaust pipe 30 at a location closer to combustion apparatus 80 than to exhaust tube holding member 10. In addition, exhaust tube fixing member 50 fixes connection pipe 60 to exhaust pipe 30. It is preferable to fix exhaust tube fixing member 50 to a ceiling 220 of building 200 after it is fixed to both exhaust tube 20 and exhaust pipe 30. Exhaust tube fixing member 50 is preferably made of the same material as exhaust tube 20.

Figure 2:
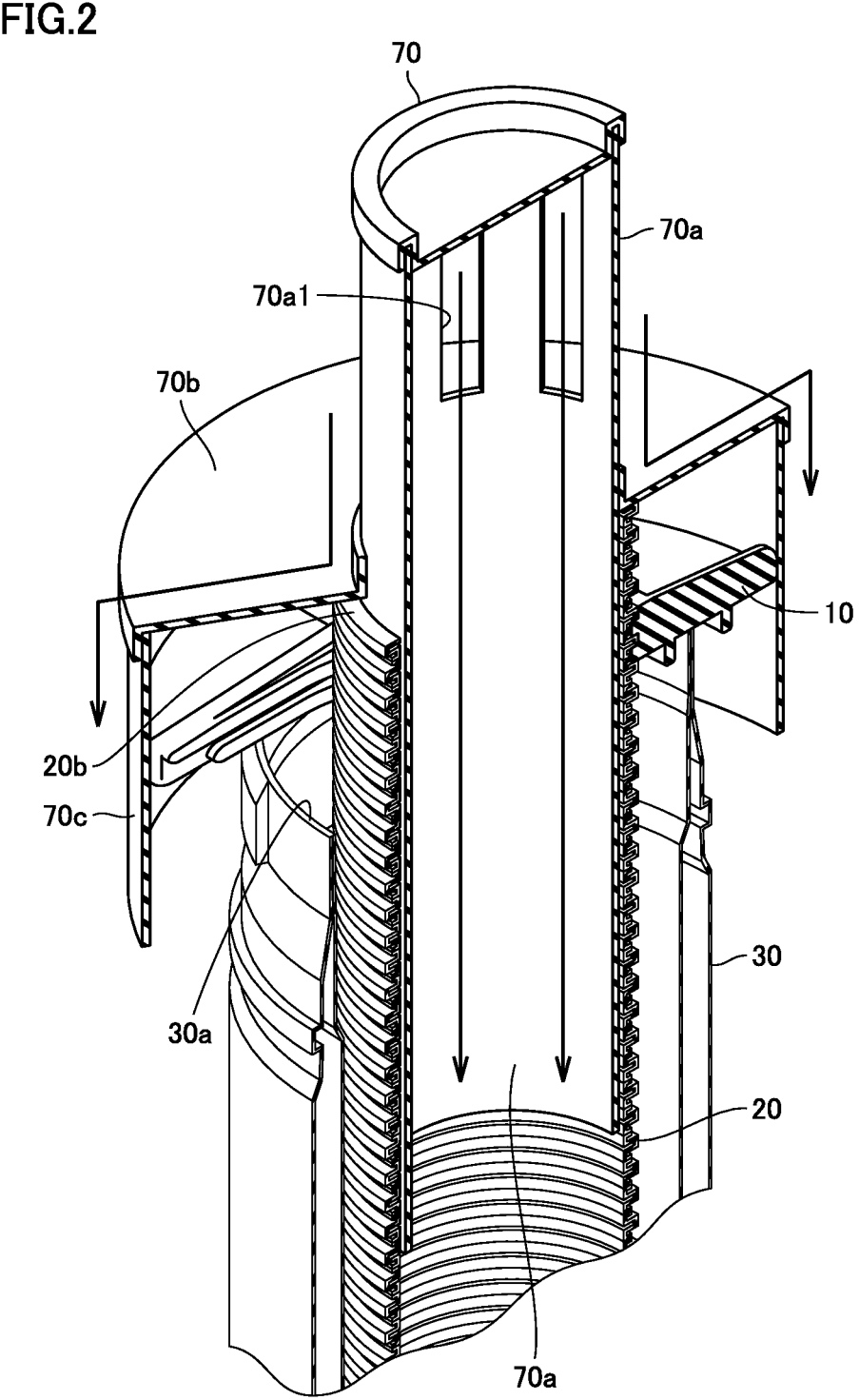
FIG. 2 is a cross-sectional perspective view of a region II in FIG. 1 for the purpose of illustrating how an exhaust tube holding member included in the exhaust structure for combustion apparatus according to an embodiment of the present invention is used to hold an exhaust tube inside an exhaust pipe.

As illustrated in FIG. 2, a rain cap 70 includes a discharge portion 70a and cover portions 70b and 70c. Discharge portion 70a has for example a cylindrical shape, and is attached to the other end 20b of exhaust tube 20. Specifically, discharge portion 70a is inserted into exhaust tube 20 from the other end 20b of exhaust tube 20, and is thereby attached to exhaust tube 20. The outer diameter of discharge portion 70a is set larger than the inner diameter of exhaust tube 20. Thus, after discharge portion 70a is inserted into exhaust tube 20, the inner diameter of exhaust tube 20 is expanded thereby, and thus exhaust tube 20 shrinks so as to reduce the expanded diameter, and the shrinking force helps to support discharge portion 70a inside exhaust tube 20.

An exhaust vent (discharge unit) 70a1 for discharging the exhaust gas after combustion to the outside (outdoor) is formed at the upper end of discharge portion 70a. With the help of exhaust vent 70a1, it is possible to discharge the exhaust gas guided by exhaust tube 20 to the outside of building 200 through rain cap 70.

Cover portions 70b and 70c of rain cap 70 cover the top surface and the side surface of exhaust tube holding member 10. Cover portions 70b and 70c include a ceiling 70b and a peripheral wall 70c. Ceiling 70b has a circular ring shape extending from the outer peripheral surface of discharge portion 70a outward circumferentially. Ceiling 70b has an outer diameter greater than the outer diameter of exhaust tube holding member 10 and covers exhaust tube holding member 10 from the above. Peripheral wall 70c has a cylindrical shape extending downward from the outer peripheral end of ceiling 70b. The inner peripheral surface of peripheral wall 70c is in contact with the outer peripheral surface of exhaust tube holding member 10. Note that the inner peripheral surface of peripheral wall 70c may not be in contact with the outer peripheral surface of exhaust tube holding member 10, and a gap may be present therebetween. Peripheral wall 70c covers the side surface of exhaust tube holding member 10.

In the above, discharge portion 70a of rain cap 70 is described as an inner cover attached to the inner peripheral surface of exhaust tube 20, it may be an outer cover attached to the outer peripheral surface of exhaust tube 20. Rain cap 70 may be made of materials such as aluminum and stainless steel.

As illustrated in FIG. 1, connection pipe 60 is configured to cover exhaust tube 20 and thereby protect exhaust tube 20. Connection pipe 60 is connected to exhaust tube fixing member 50 and combustion apparatus 80. Connection pipe 60 has a larger outer diameter than exhaust tube 20. A part of exhaust tube 20 closer to the other end 20b is inserted inside connection pipe 60.

Connection pipe 60 is described as a flexible pipe such as an accordion pipe, it may be a spiral pipe as well. Since connection pipe 60 is flexible, it is possible for connection pipe 60 to follow the shape of exhaust tube 20 easily. Moreover, since connection pipe 60 is flexible, it is easier to connect connection pipe 60 to combustion apparatus 80.

Connection pipe 60 may be a pipe made of for example aluminum. As a result, it is possible to reduce the self weight so as to reduce the load for exhaust tube fixing member 50 to support connection pipe 60, and meanwhile since aluminum has a certain degree of hardness, it is possible to prevent connection pipe 60 from deformation due to its self weight. Furthermore, since a pipe made of aluminum can be relatively readily processed through cutting or the like, it can be readily adapted to the length of exhaust tube 20, for example.

Exhaust tube holding member 10 is configured to hold exhaust tube 20, which is connected to combustion apparatus 80, inside exhaust pipe 30. Exhaust tube holding member 10 is preferably made of a material having acid resistance. The material of exhaust tube holding member 10 be selected from materials having acid resistance such as phenol resin, epoxy resin, silicone resin, fluorine resin such as tetrafluoroethylene, unsaturated polyester resin, melamine resin, polycarbonate resin, methacryl styrene (MS) resin, methacryl resin, styrene acrylonitrile copolymer (AS) resin, ABS resin, polyethylene, polypropylene, polystyrene, polyethylene terephthalate (PET), and vinyl chloride resin. Exhaust tube holding member 10 may also be a wire or a metal plate, for example.

Hereinafter, the configuration of exhaust tube holding member 10 mentioned above will be described with reference to FIGS. 3 to 7.

Figure 3:
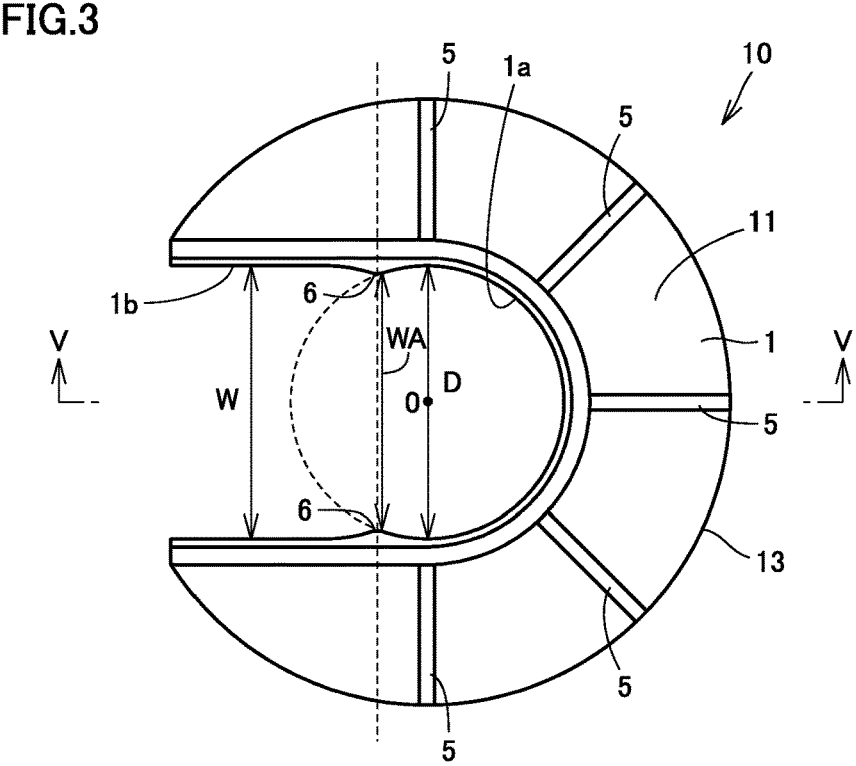
FIG. 3 is a planar view schematically illustrating the configuration of the exhaust tube holding member included in the exhaust structure for combustion apparatus according to an embodiment of the present invention.
Figure 4:
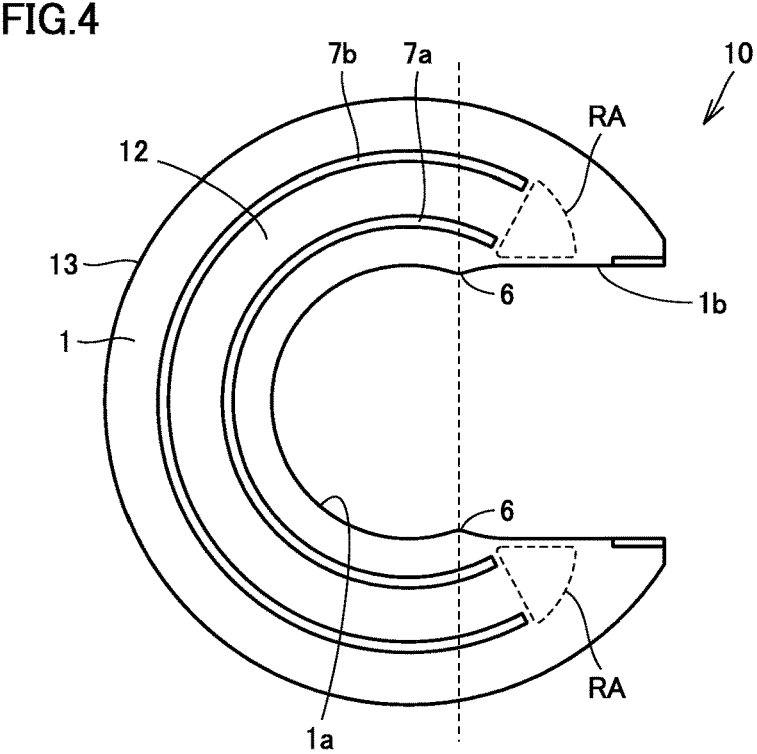
FIG. 4 is a bottom view schematically illustrating the configuration of the exhaust tube holding member illustrated in FIG. 3.

As illustrated in FIGS. 3 and 4, exhaust tube holding member 10 includes a main body 1. Body 1 has, for example, a disk shape or an elliptical shape. One of the disk shape and the elliptical shape is selected depending on the cross-sectional shape of exhaust tube 20. Body 1 includes a first surface 11 and a second surface 12 opposing each other. Main body 1 further includes a rim 13 which surrounds the periphery of first surface 11 and second surface 12. Body 1 is provided with an exhaust tube holding hole 1a and an exhaust tube inserting notch 1b.

Exhaust tube holding hole 1a is configured to penetrate main body 1 from first surface 11 to second surface 12. When viewed from a direction orthogonal to first surface 11 or second surface 12 (in planar view), exhaust tube holding hole 1a has, for example, a circular shape. Exhaust tube inserting notch 1b penetrates main body 1 from first surface 11 to second surface 12. Exhaust tube inserting notch 1b extends from exhaust tube holding hole 1a to rim 13. Exhaust tube inserting notch 1b has, for example, a straight strip shape having a constant width W in planar view.

Main body 1 has a width WA smaller than width W of exhaust tube inserting notch 1b at a boundary portion 6 between exhaust tube holding hole 1a and exhaust tube inserting notch 1b (a portion positioned along the dashed straight line in FIGS. 3 and 4). Width W of exhaust tube inserting notch 1b is substantially equal to a diameter D of exhaust tube holding hole 1a.

Figure 5:
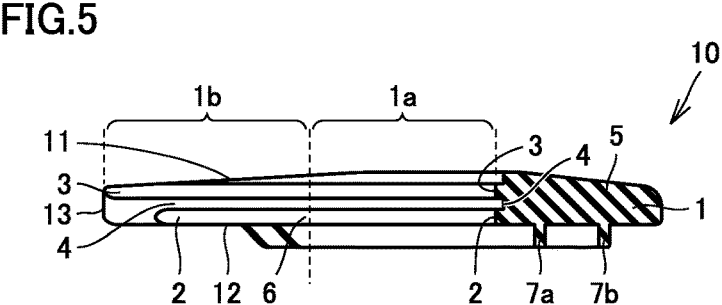
FIG. 5 is a schematic sectional view taken along line V-V in FIG. 3.
Figure 6:
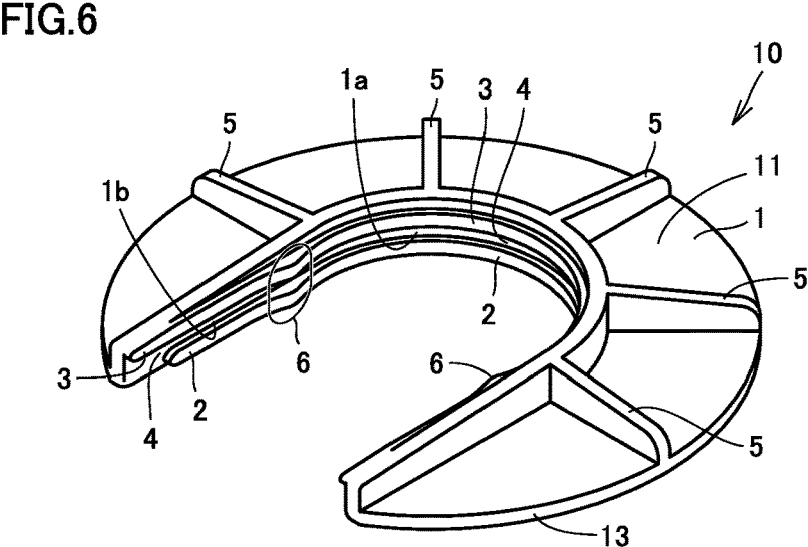
FIG. 6 is a perspective view observed from the top side of the exhaust tube holding member illustrated in FIG. 3.
Figure 7:
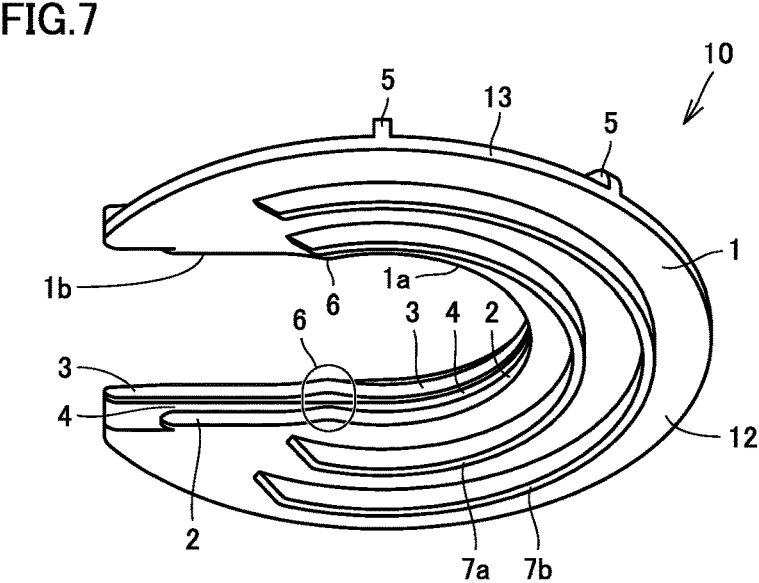
FIG. 7 is a perspective view observed from the bottom side of the exhaust tube holding member illustrated in FIG. 3.

As illustrated in FIGS. 5 to 7, the wall surface defining exhaust tube holding hole 1a is formed with exhaust tube holding projection and recess portions 2, 3 and 4 matching the shape of the outer peripheral surface of exhaust tube 20. Exhaust tube holding projection and recess portions 2, 3 and 4 are formed on the circular peripheral surface of exhaust tube holding hole 1a. Exhaust tube holding projection and recess portions 2, 3 and 4 include a recess (holding recess part) 4, a projection (first holding projection part) 3 which is located on one side of recess 4 (closer to first surface 11), and a projection (second holding projection part) 2 located on the other side of recess 4 (closer to second surface 12).

The wall surface defining exhaust tube inserting notch 1b is formed with exhaust tube inserting projection and recess portions 2, 3 and 4 matching the shape of the outer peripheral surface of exhaust tube 20. Exhaust tube inserting projection and recess portions 2, 3 and 4 extend in the radial direction of main body 1 (in a direction from exhaust tube holding hole 1a toward rim 13). Exhaust tube inserting projection and recess portions 2, 3 and 4 include a recess (inserting recess part) 4, a projection 3 (first inserting projection part) which is located on one side of recess 4 (closer to first surface 11), and a projection 2 (second inserting projection part) located on the other side of recess 4 (closer to second surface 12).

Recess 4 of exhaust tube holding hole 1a is in continuation with recess 4 of exhaust tube inserting notch 1b. Projection 2 of exhaust tube holding hole 1a is in continuation with projection 2 of exhaust tube inserting notch 1b. Projection 3 of exhaust tube holding hole 1a is in continuation with portion 3 of exhaust tube protruding inserting notch 1b.

Projection 3 of exhaust tube holding hole 1a extends to rim 13 of main body 1 further than projection 2 of exhaust tube holding hole 1a. In the present embodiment, projection 2 of exhaust tube holding hole 1a is configured not to reach rim 13, but projection 3 is configured to reach rim 13.

As illustrated in FIGS. 3 and 6, main body 1 is provided with a plurality of reinforcing ribs 5. Each of the plurality of reinforcing ribs 5 protrudes from first surface 11 of main body 1. The plurality of reinforcing ribs 5 extend radially from exhaust tube holding hole 1a to rim 13. Note that reinforcing ribs 5 are not provided in the region where exhaust tube inserting notch 1b is provided (in FIG. 3, the region of exhaust tube inserting notch 1b outer than the dashed straight line).

As illustrated in FIGS. 4 and 7, main body 1 is provided with positioning protrusions 7a and 7b. Positioning protrusions 7a and 7b include for example a first positioning protrusion 7a and a second positioning protrusion 7b. First and second positioning protrusions 7a, 7b each protrudes from second surface 12 of main body 1.

In planar view, each of first and second positioning protrusions 7a, 7b is formed in conformity with the shape of the upper end opening of exhaust pipe 30. Specifically, each of first and second positioning protrusions 7a, 7b has an arc shape, for example. First positioning protrusion 7a may be used to position exhaust pipe 30 with an upper end opening of a smaller diameter (for example, 3 inches). Second positioning protrusion 7b may be used to position exhaust pipe 30 with an upper end opening of a larger diameter (for example, 4 inches). Accordingly, exhaust tube holding member 10 of the present embodiment can be used to cope with the positioning of a plurality of exhaust pipes 30 with an upper end opening different in diameter.

As illustrated in FIG. 4, each of first and second positioning protrusions 7a and 7b surrounds the periphery of exhaust tube holding hole 1a. Specifically, first positioning protrusion 7a surrounds the outer periphery around exhaust tube holding hole 1a, and second positioning protrusion 7b further surrounds the outer periphery around first positioning protrusion 7a.

Each of first and second positioning protrusions 7a, 7b is provided that none of them will reach exhaust tube inserting notch 1b. In other words, between the end of each of first and second positioning protrusions 7a and 7b in the circumferential direction and exhaust tube inserting notch 1b, there exists a region RA where none of first and second positioning protrusions 7a and 7b is formed.

Next, the installation method of the exhaust structure for combustion apparatus according to the present embodiment will be described with reference to FIGS. 1 and 8 to 12.

As illustrated in FIG. 1, one end 20a of exhaust tube 20 is connected to combustion apparatus 80. The other end 20b of exhaust tube 20 is inserted through exhaust pipe 30 from the lower end of exhaust pipe 30.

Figure 8:
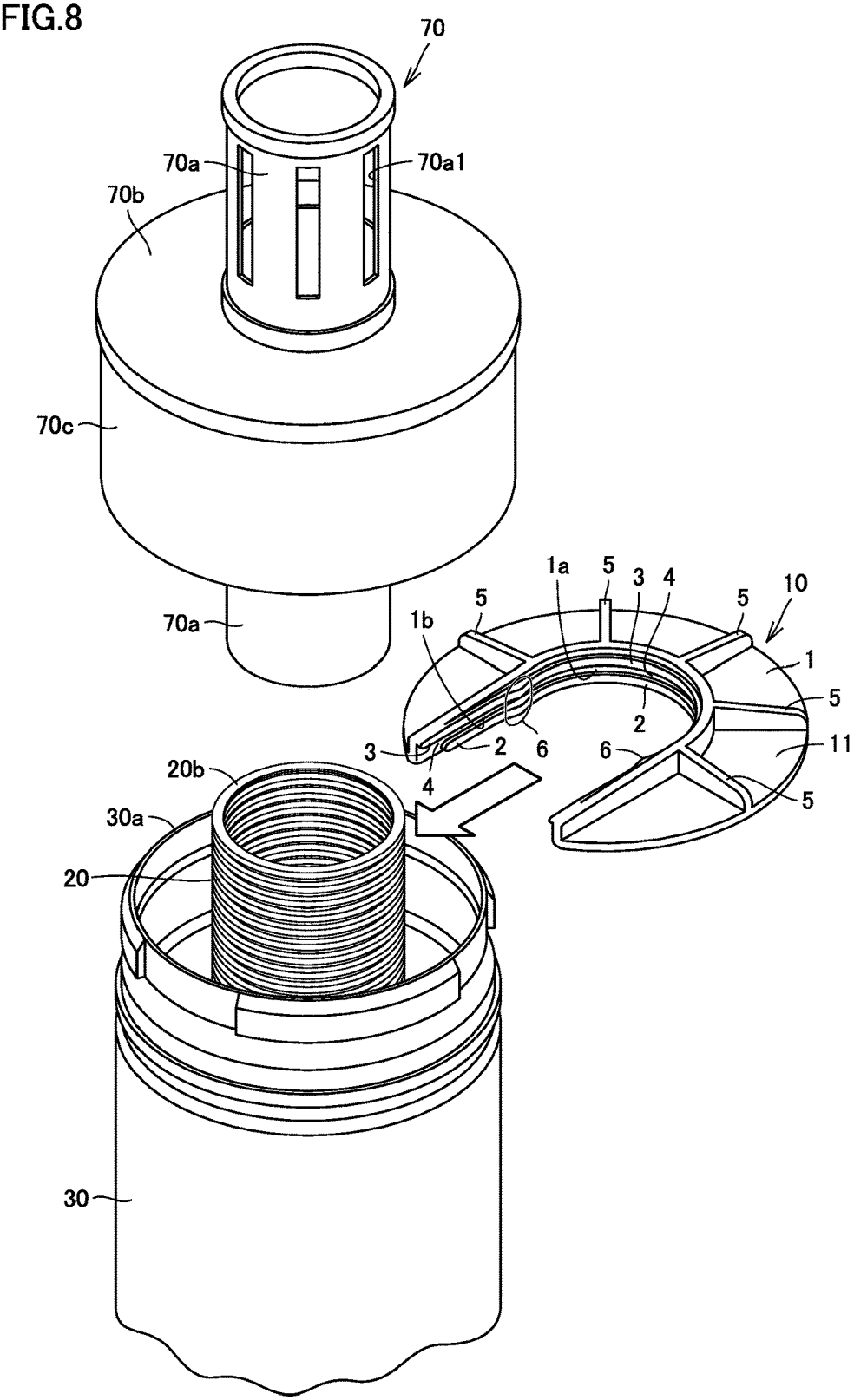
FIG. 8 is a perspective view illustrating a first step of a method of installing an exhaust structure for combustion apparatus according to an embodiment of the present invention.

As illustrated in FIG. 8, the other end 20b of exhaust tube 20 is pulled out of an upper end opening 30a of exhaust pipe 30. After the other end 20b of exhaust tube 20 is pulled out of upper end opening 30a of exhaust pipe 30, exhaust tube holding member 10 is attached to the outer peripheral surface of exhaust tube 20. The attachment of exhaust tube holding member 10 to exhaust tube 20 is performed by attaching exhaust tube holding member 10 to the outer peripheral surface of exhaust tube 20 from the radial direction of exhaust tube 20. Specifically, exhaust tube 20 is inserted into exhaust tube holding hole 1a through exhaust tube inserting notch 1b of exhaust tube holding member 10, and thereby exhaust tube holding member 10 is attached to exhaust tube 20.

In performing the attachment, firstly, the opening ends of exhaust tube inserting notch 1b at rim 13 are outfitted onto the outer peripheral surface of exhaust tube 20. At this time, exhaust tube holding member 10 is outfitted onto the outer peripheral surface of exhaust tube 20 with the opening ends of exhaust tube inserting notch 1b pointing downward while with exhaust tube holding hole 1a pointing upward. Since exhaust tube holding member 10 has region RA (see FIG. 4) where none of positioning protrusions 7a and 7b is formed between the end of each of first and second positioning protrusions 7a and 7b in the circumferential direction and exhaust tube inserting notch 1b. Therefore, in outfitting exhaust tube holding member 10 onto the outer peripheral surface of exhaust tube 20, positioning protrusions 7a and 7b of exhaust tube holding member 10 are prevented from interfering with upper end opening 30a of exhaust pipe 30.

Projection 3 provided on the wall surface of exhaust tube inserting notch 1b extends to the side of rim 13 further than projection 2. Therefore, when outfitting the opening ends of exhaust tube inserting notch 1b onto the outer peripheral surface of exhaust tube 20, projection 3 can be placed on a projection formed on the outer peripheral surface of exhaust tube 20. The placement of projection 3 on a projection formed on the outer peripheral surface of exhaust tube 20 allows exhaust tube holding member 10 to be positioned relative to exhaust tube 20 in the axial direction.

After exhaust tube 20 is inserted into exhaust tube inserting notch 1a, the projection on the outer peripheral surface of exhaust tube 20 can be sandwiched between projection 2 and projection 3, and thereby held by the same. Thereby, exhaust tube holding member 10 is guided relative to exhaust tube 20 in the radial direction, and thus, exhaust tube holding member 10 is prevented from displacing from exhaust tube 20 in the axial direction. Therefore, the operation of attaching exhaust tube holding member 10 to exhaust tube 20 is facilitated.

In addition, no reinforcing rib is provided to extend from exhaust tube holding hole 1a to rim 13. As a result, it is possible to make main body 1 around exhaust tube inserting notch 1b flexible. Therefore, when exhaust tube 20 is pushed to pass through exhaust tube inserting notch 1b, main body 1 around exhaust tube inserting notch 1b bends in accordance with the shape of the outer peripheral surface of exhaust tube 20, making the attachment of exhaust tube holding member 10 to exhaust tube 20 easier.

Figure 9:
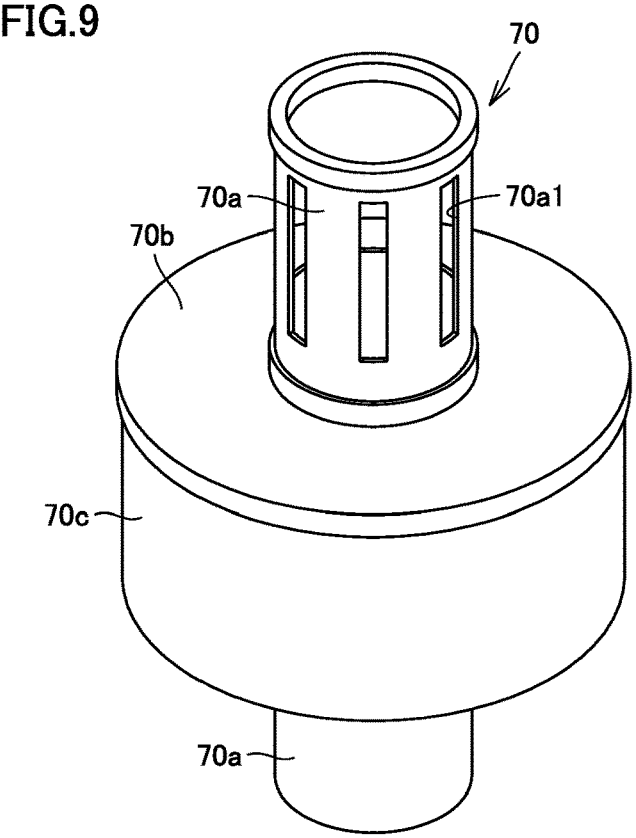
FIG. 9 is a perspective view illustrating a second step of a method of installing an exhaust structure for combustion apparatus according to an embodiment of the present invention.
Figure 9:
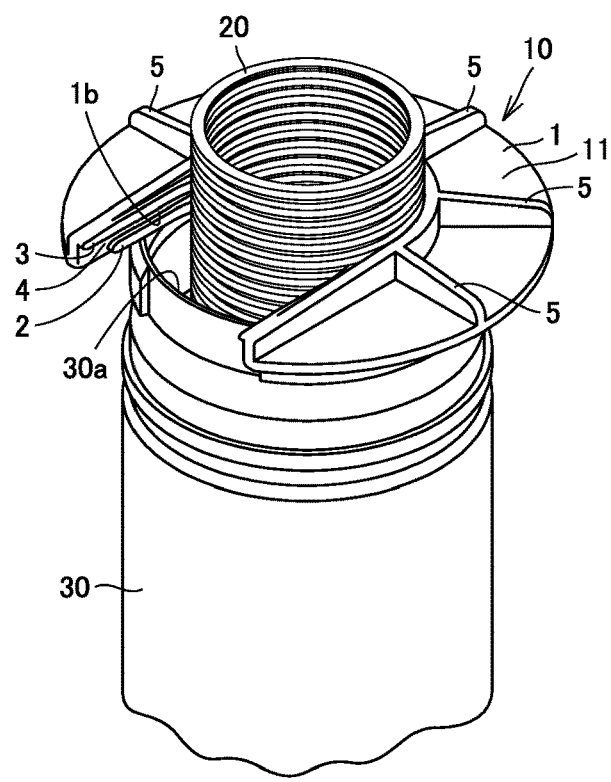

During the attachment, after exhaust tube 20 passes through exhaust tube inserting notch 1b of exhaust tube holding member 10, it continues to pass through boundary portions 6 and enter into exhaust tube holding hole 1a. Accordingly, as illustrated in FIG. 9, after exhaust tube holding member 10 is attached to exhaust tube 20, exhaust tube 20 is held inside exhaust tube holding hole 1a of exhaust tube holding member 10.

Figure 10:
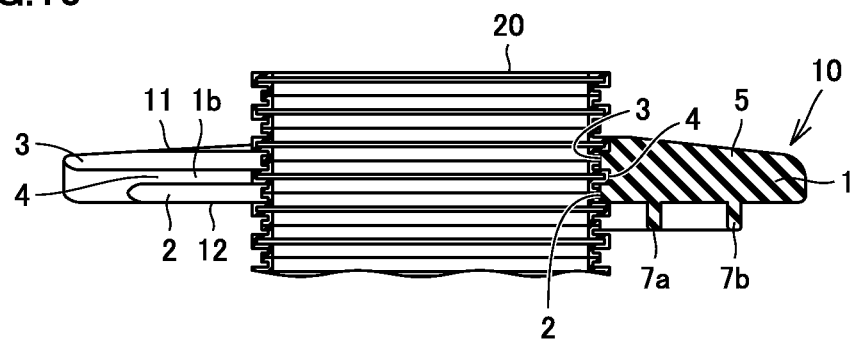
FIG. 10 is a sectional view schematically illustrating how the exhaust tube holding member illustrated in FIG. 3 is attached to the exhaust tube.

As illustrated in FIG. 10, in the held state, the projection and recess portions on the outer peripheral surface of exhaust tube 20 fit respectively with the exhaust tube inserting projection and recess portions 2, 3 and 4. In other words, the projection on the outer peripheral surface of exhaust tube 20 fits into recess 4 of the exhaust tube inserting projection and recess portions 2, 3 and 4, and the recesses on the outer peripheral surface of exhaust tube 20 fit with projections 2 and 3 of the exhaust tube inserting projection and recess portions 2, 3 and 4. As a result, exhaust tube holding member 10 can be prevented from displacing relative to exhaust tube 20 in the axial direction.

Main body 1 is provided with a reinforcing rib 5 protruding from first surface 11. With the help of reinforcing rib 5, it is possible to improve the strength of the outer periphery around exhaust tube holding hole 1a, allowing exhaust tube holding member 10 to hold exhaust tube 20 securely.

As illustrated in FIG. 3, main body 1 has width WA smaller than width W of exhaust tube inserting notch 1b at boundary portion 6. Thus, as illustrated in FIG. 9, once after exhaust tube 20 is inserted into exhaust tube holding hole 1a, exhaust tube 20 is prevented from slipping out from exhaust tube holding hole 1a back to exhaust tube inserting notch 1b.

Figure 11:
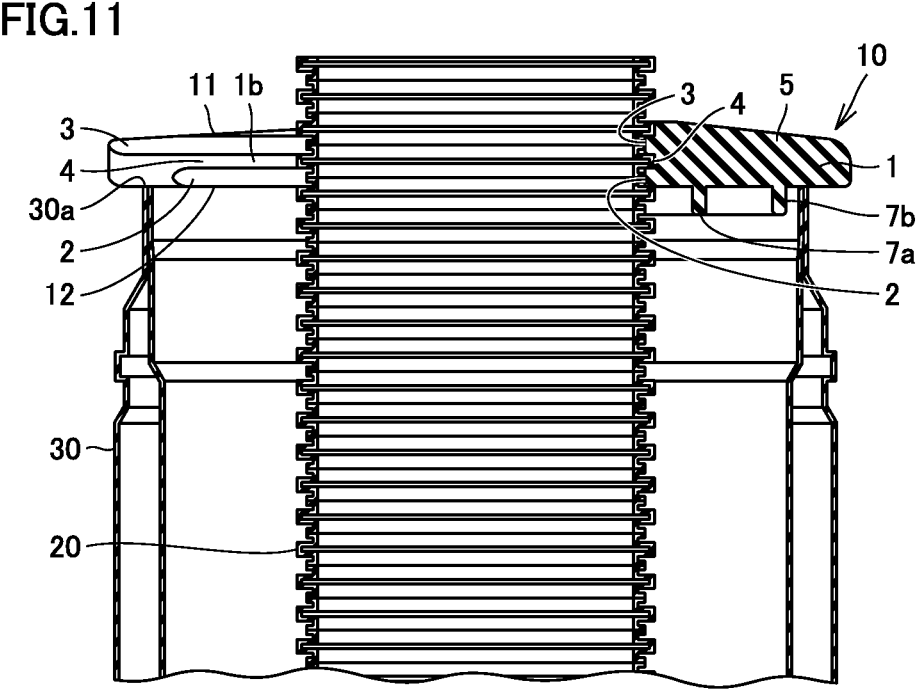
FIG. 11 is a sectional view schematically illustrating how the exhaust tube holding member illustrated in FIG. 3 is used to hold the exhaust tube inside the exhaust pipe of a larger diameter.

As illustrated in FIG. 11, exhaust tube holding member 10 is pressed against upper end opening 30a of exhaust pipe 30 by a force tending to shrink exhaust tube 20. As a result, upper end opening 30a of exhaust pipe 30 is brought into contact with second surface 12 of exhaust tube holding member 10. At this state, the second positioning protrusion 7b is located closer to the inner peripheral surface of upper end opening 30a of exhaust pipe 30. With the help of second positioning protrusion 7b, exhaust tube holding member 10 can be positioned relative to upper end opening 30a of exhaust pipe 30.

Figure 12:
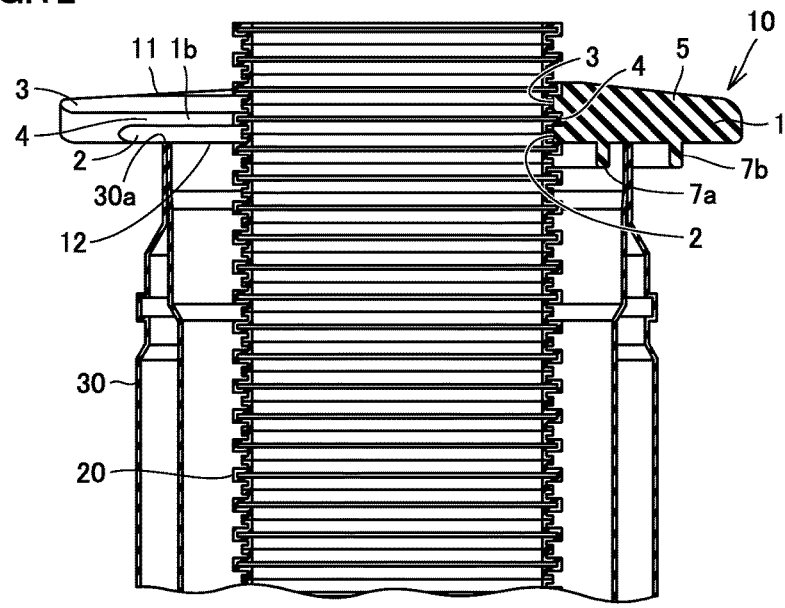
FIG. 12 is a sectional view schematically illustrating how the exhaust tube holding member illustrated in FIG. 3 is used to hold the exhaust tube inside the exhaust pipe of a smaller diameter.

However, in the case where exhaust pipe 30 has a smaller diameter (for example, 3 inches) as illustrated in FIG. 12, first positioning protrusion 7a is located closer to the inner peripheral surface of upper end opening 30a of exhaust pipe 30. With the help of first positioning protrusion 7a, exhaust tube holding member 10 can be positioned relative to upper end opening 30a of exhaust pipe 30.

As illustrated in FIG. 9, in the held state, exhaust tube inserting notch 1b communicates an internal space of exhaust pipe 30 with an external space of exhaust pipe 30. As a result, even if the exhaust gas leaks from the interior of exhaust tube 20 to the outside, it is possible to discharge the exhaust gas from the interior of exhaust pipe 30 through exhaust tube inserting notch 1b to the outside of exhaust pipe 30.

Thereafter, as illustrated in FIG. 2, rain cap 70 is attached to exhaust tube 20. Specifically, discharge portion 70a of rain cap 70 is inserted into exhaust tube 20 from the other end 20b of exhaust tube 20. Accordingly, exhaust structure for combustion apparatus 100 of the present embodiment is installed in building 200.

Figure 13:
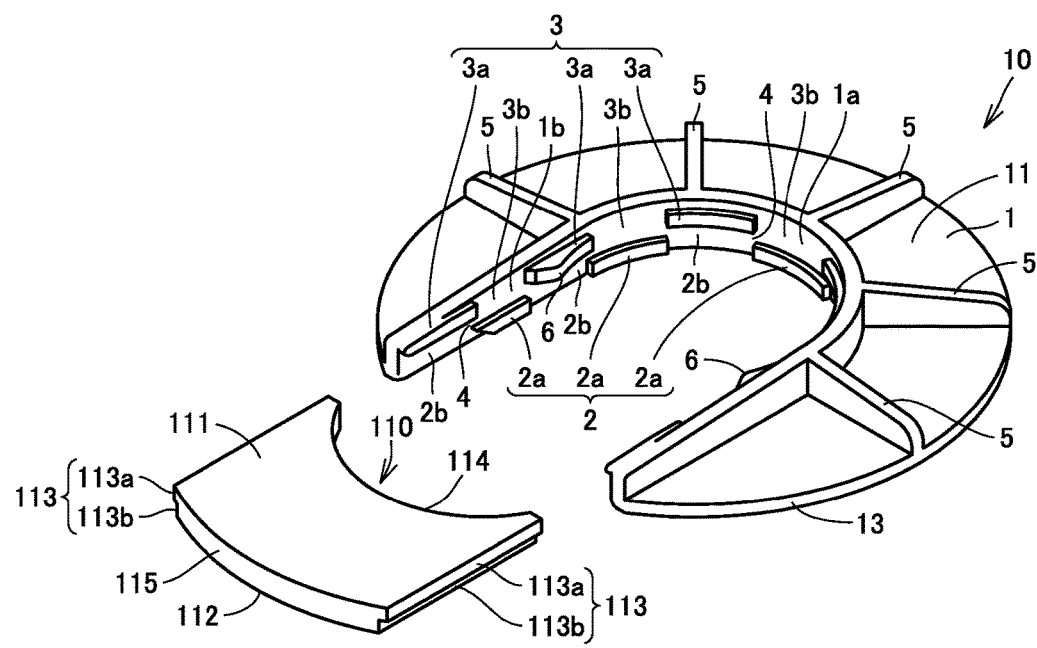
FIG. 13 is an exploded perspective view schematically illustrating the configuration of the exhaust tube holding member provided with a blockage plate.

As illustrated in FIG. 9, in the embodiment mentioned above, it is described that exhaust tube inserting notch 1b communicates the internal space of exhaust pipe 30 with the external space of exhaust pipe 30, and however, it is acceptable that upper end opening 30a of exhaust pipe 30 is blocked by exhaust tube holding member 10. Specifically, as illustrated in FIG. 13, exhaust tube holding member 10 is provided with a blockage plate 110, and blockage plate 110 is configured to be held by main body 1 after it is inserted into exhaust tube inserting notch 1b.

Blockage plate 110 is formed from a plain plate and is provided with a protrusion 113a and a recess 113b on each of two side surfaces 113 opposing each other. After blockage plate 110 is inserted into exhaust tube inserting notch 1b, protrusion 113a fits into recess 4, and recess 113b fits with projection 2.

Figure 14:
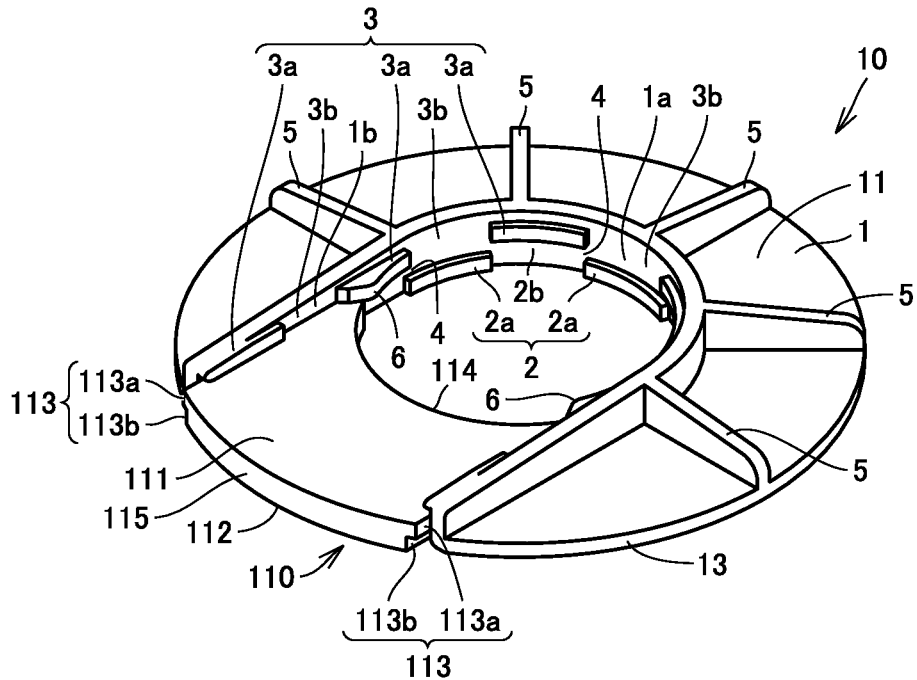
FIG. 14 is a perspective view schematically illustrating an assembled configuration of the exhaust tube holding member provided with a blockage plate.

As illustrated in FIG. 14, an inner side surface 114 of blockage plate 110 has a radius of curvature greater than an outer side surface 115 thereof. After blockage plate 110 is inserted into exhaust tube inserting notch 1b, inner side surface 114 is located inside exhaust tube holding member 10, and outer side surface 115 is located outside exhaust tube holding member 10. The radius of curvature of inner side surface 114 is equal to that of exhaust tube holding hole 1a, and the radius of curvature of outer side surface 115 is equal to that of the outer contour of main body 1. Thus, after blockage plate 110 is inserted into exhaust tube inserting notch 1b, the outer contour of exhaust tube holding member 10 is substantially circular. Similarly, exhaust tube holding hole 1a enclosed by main body 1 and blockage plate 110 is substantially circular in shape. Each of an upper surface 111 and a lower surface 112 of blockage plate 110 is for example a plain surface.

Figure 15:
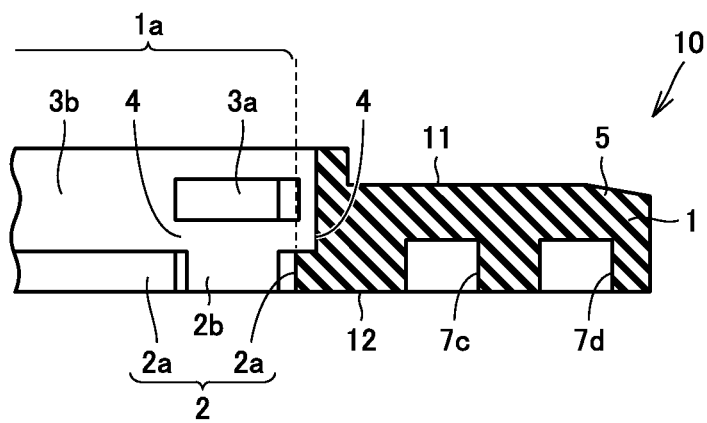
FIG. 15 is a partial cross-sectional view schematically illustrating the configuration of the exhaust tube holding member provided with a positioning recess.
Figure 16:
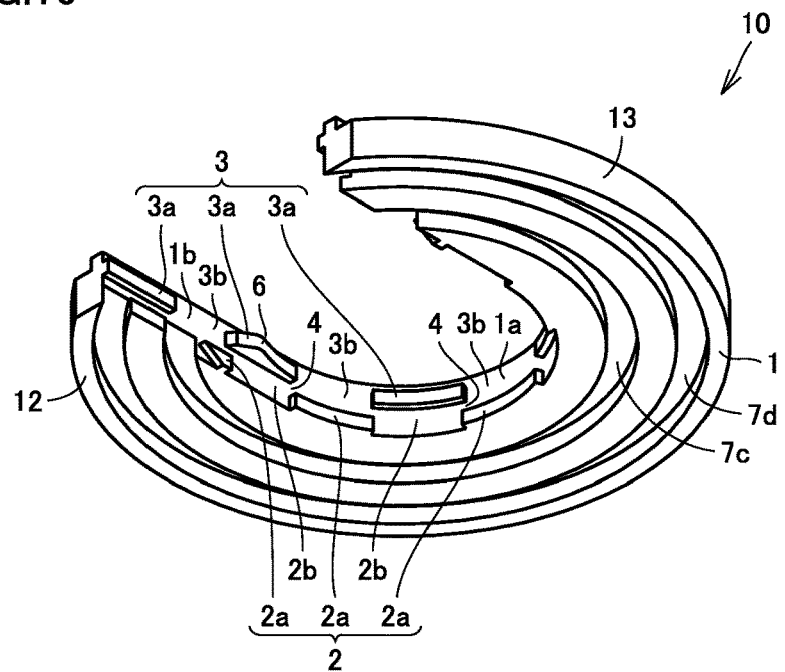
FIG. 16 is a perspective view observed from the side of a second surface and schematically illustrating the configuration of the exhaust tube holding member provided with a positioning recess.

As illustrated in FIGS. 15 and 16, second surface 12 of main body 1 is provided with a first positioning recess 7c and a second positioning recess 7d. Each of first positioning recess 7c and second positioning recess 7d has a circular shape concentric with exhaust tube holding hole 1a when viewed from a direction orthogonal to second surface 12.

Figure 17:
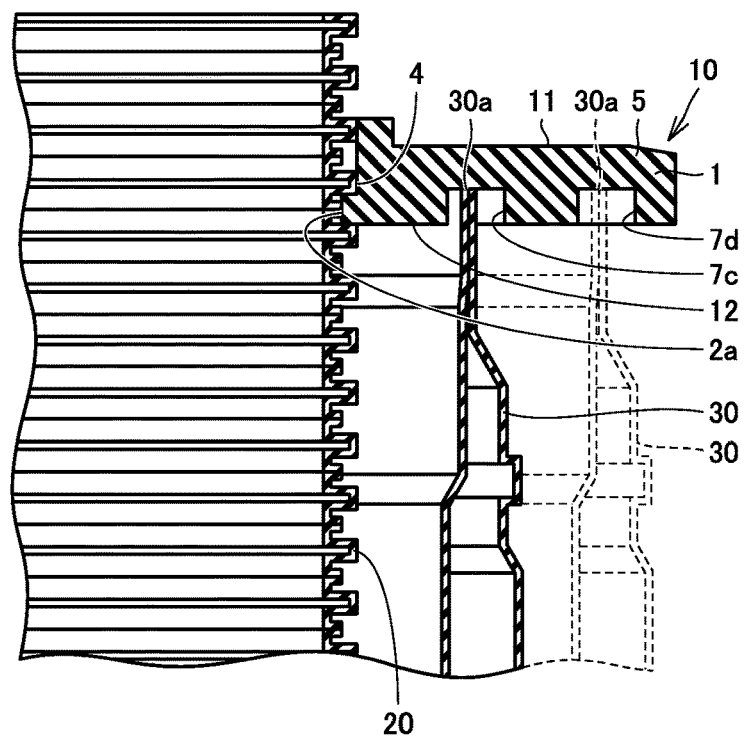
FIG. 17 is a cross-sectional view schematically illustrating that in the case where the exhaust tube holding member provided with a positioning recess, the upper end opening contacts the positioning recess.

As illustrated in FIG. 17, each of first positioning recess 7c and second positioning recess 7d is in contact with upper end opening 30a of exhaust pipe 30. First positioning recess 7c is used to position exhaust pipe 30 with upper end opening 30a of a smaller diameter (for example, 3 inches). Second positioning recess 7d is used to position exhaust pipe 30 with upper end opening 30a of a larger diameter (for example, 4 inches).

Figure 18:
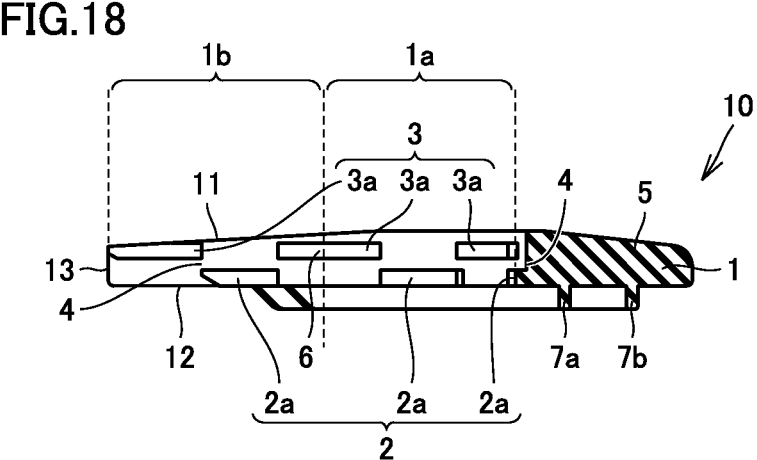
FIG. 18 is a cross-sectional view schematically illustrating the configuration of the exhaust tube holding member in which a two-step projection offset in vertical direction is disposed on the inner peripheral surface of an exhaust tube holding hole and an exhaust tube inserting notch.

As illustrated in FIGS. 13 and 18, projection 2 and projection 3 may be arranged to be offset to each other in the vertical direction from first surface 11 toward second surface 12. Specifically, projection 2 on each of exhaust tube holding hole 1a and exhaust tube inserting notch 1b is divided by a plurality of cutouts 2b into a plurality of projection strips 2a, and projection 3 on each of exhaust tube holding hole 1a and exhaust tube inserting notch 1b is divided by a plurality of cutouts 3b into a plurality of projection strips 3a.

Each cutout 3b in exhaust tube holding hole 1a is located at the side of first surface 11 with respect to projection strip 2a in exhaust tube holding hole 1a. Each cutout 2b in exhaust tube holding hole 1a is located at the side of second surface 12 with respect to projection strip 3a in exhaust tube holding hole 1a.

Similarly, each cutout 3b in exhaust tube inserting notch 1b is located at the side of first surface 11 with respect to projection strip 2a in exhaust tube inserting notch 1b. Each cutout 2b in exhaust tube inserting notch 1b is located at the side of second surface 12 with respect to projection strip 3a in exhaust tube inserting notch 1b. Each of cutouts 2b and 3b is formed at a position where projection 2 or 3 is not formed.

Figure 19:
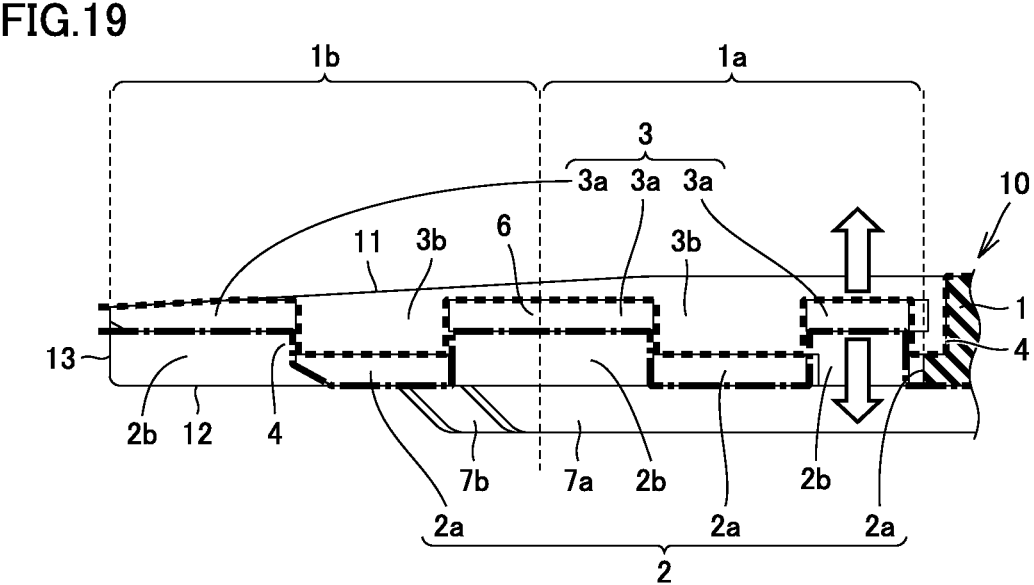
FIG. 19 is a cross-sectional view schematically illustrating the cross section of a molding die positioned at the side of a first surface and the cross section of a molding die positioned at the side of a second surface when molding the exhaust tube holding member illustrated in FIG. 18 by using the molding die.

Since projection 2 and projection 3 are arranged offset to each other in the vertical direction, as illustrated in FIG. 19, when molding exhaust tube holding member 10 by using a molding die, the split face of a first molding die to be arranged at the side of first surface 11 may take a shape indicated by a dotted line, and the split surface of a second molding die to be arranged at the side of second surface 12 may take a shape indicated by a dashed line. As a result, there is no need to dispose an additional molding die between the first molding die and the second molding die, making it possible to simplify the design of the molding die.

Figure 20:
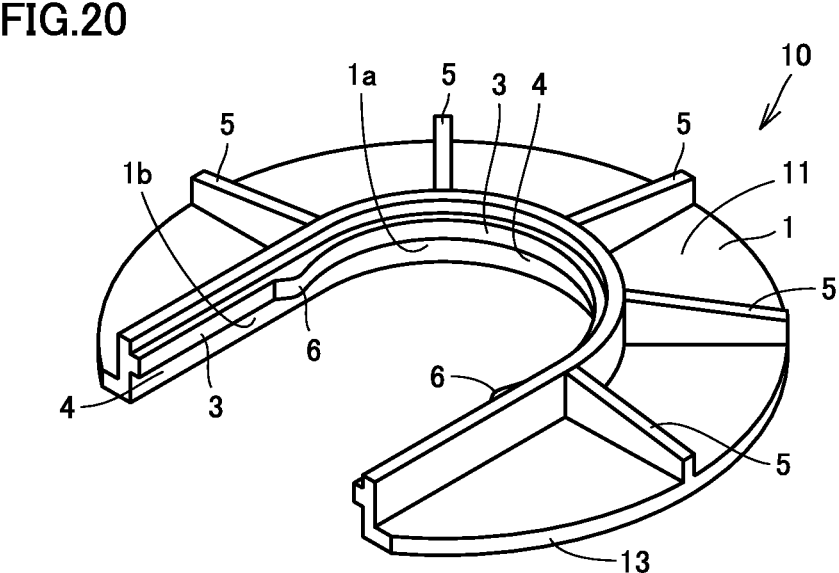
FIG. 20 is a perspective view schematically illustrating the configuration of the exhaust tube holding member in which a one-step projection is disposed on the inner peripheral surface of the exhaust tube holding hole and the exhaust tube inserting notch.

As illustrated in FIG. 20, exhaust tube holding projection and recess portions 3 and 4 includes a holding recess part 4, and a holding projection part 3 positioned at one side of holding recess part 3. Exhaust tube inserting projection and recess portions 3 and 4 include an inserting recess part 4, and an inserting projection part 3 positioned at one side of inserting recess part 4. Exhaust tube holding projection and recess portions 3 and 4 include no other projection part except the single holding projection part 3. Exhaust tube inserting projection and recess portions 3 and 4 include no other projection part except the single inserting projection part 3.

Figure 21:
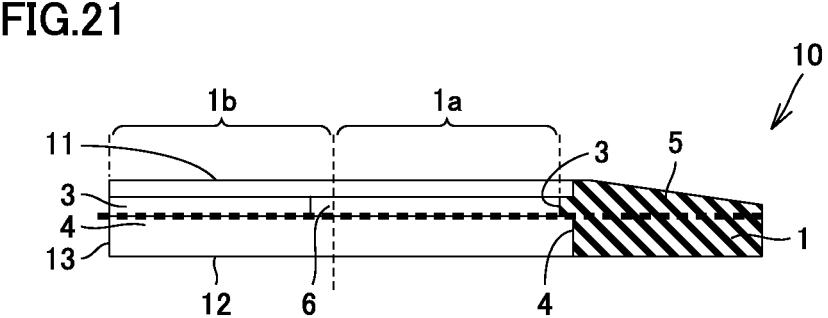
FIG. 21 is a cross-sectional view schematically illustrating the split face of a molding die arranged at the side of a first surface and the split face of a molding die arranged at the side of a second surface when molding the exhaust tube holding member illustrated in FIG. 20 by using a molding die.

Accordingly, as illustrated in FIG. 21, when molding exhaust tube holding member 10 by using a molding die, the split face of a first molding die to be arranged at the side of first surface 11 may take a shape indicated by a dotted line, and the split surface of a second molding die to be arranged at the side of second surface 12 may take the same shape indicated by the dotted line. As a result, there is no need to dispose an additional molding die between the first molding die and the second molding die, making it possible to simplify the design of the molding die.

It should be noted that exhaust tube holding projection and recess portion 3 and exhaust tube inserting projection and recess portion 3 are joined together to form an integrated projection.

Figure 22:
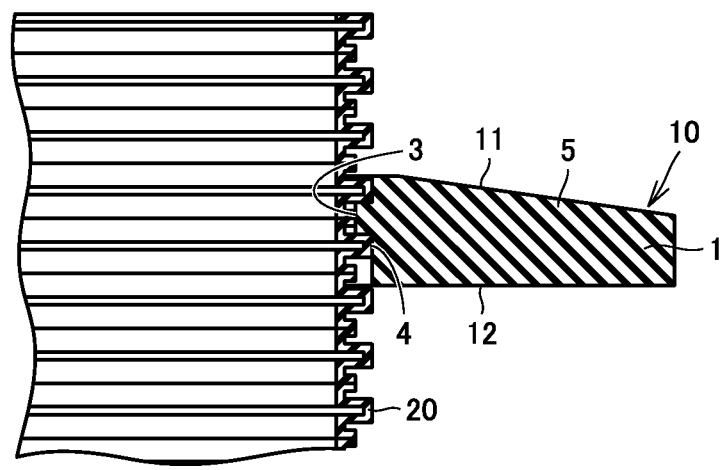
FIG. 22 is a cross-sectional view schematically illustrating how the exhaust tube holding member illustrated in FIG. 20 is used to hold the exhaust tube.

As illustrated in FIG. 22, even in the case where only a single projection 3 (holding projection part 3 or inserting projection part 3) is formed as mentioned in the above, after exhaust tube 20 is held by exhaust tube holding member 10, the single projection 3 fits a recess formed on the outer peripheral surface of exhaust tube 20. Thereby, exhaust tube holding member 10 is securely held on exhaust tube 20.

Hereinafter, the configuration of combustion apparatus 80 used in exhaust structure for combustion apparatus 100 mentioned above will be described with reference to FIGS. 23 and 24.

As described in the above, combustion apparatus 80 used in the above exhaust structure for combustion apparatus 100 may be a water heater of a latent heat recovery type adapted to an exhaust suction and combustion system.

Figure 23:
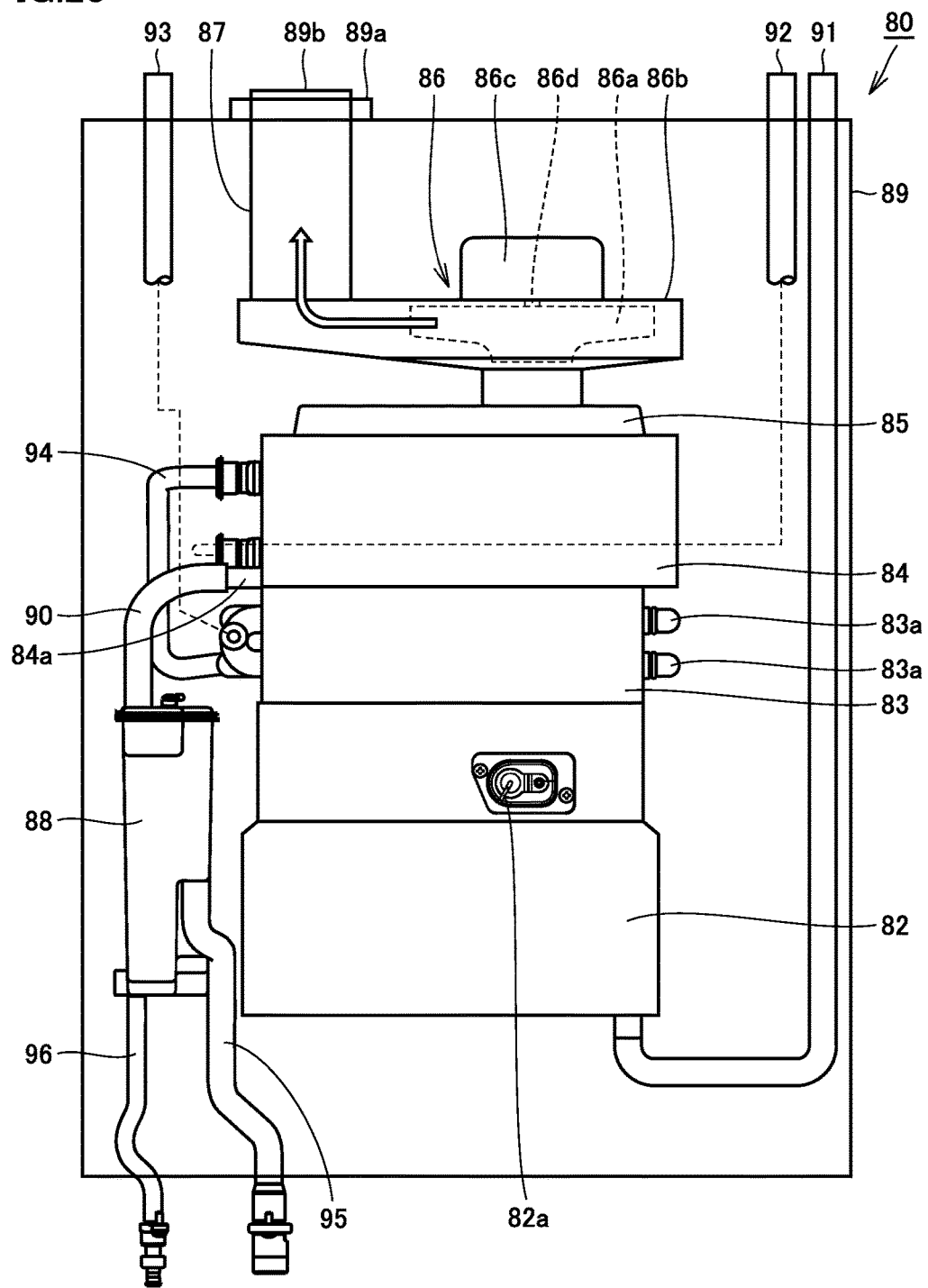
FIG. 23 is a front view schematically illustrating the configuration of a water heater which serves as one example of the exhaust structure for combustion apparatus according to an embodiment of the present invention.
Figure 24:
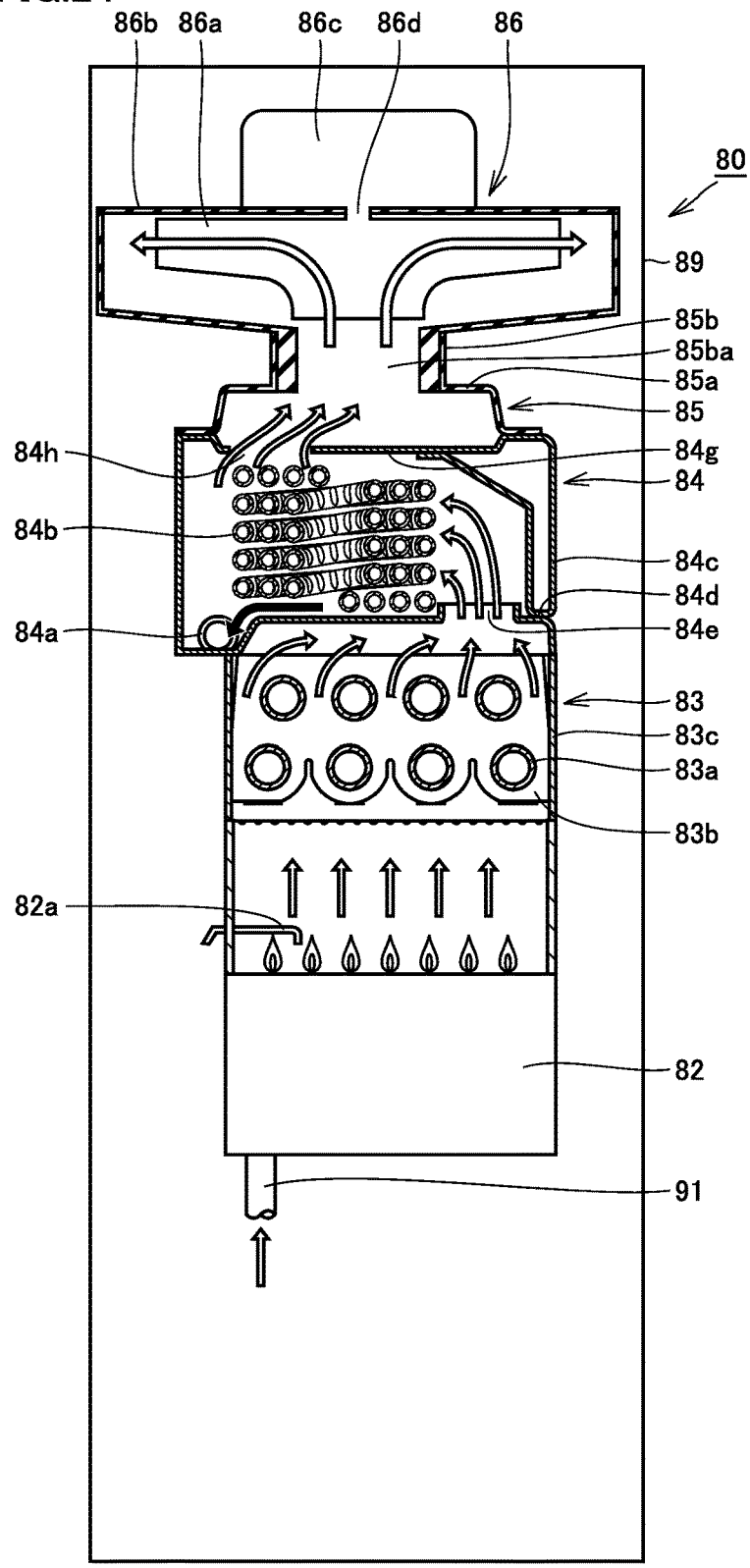
FIG. 24 is a partial cross-sectional side view schematically illustrating the configuration of the water heater illustrated in FIG. 23.

As illustrated in FIGS. 23 and 24, combustion apparatus 80 generally includes a burner 82, a primary heat exchanger 83, a secondary heat exchanger 84, an exhaust box 85, a fan 86, a connection pipe 87, a drainage water tank 88, a housing 89, and pipes 90 to 96.

Burner 82 is configured to produce a combustion gas by combusting a fuel gas. Burner 82 is connected to a gas supply pipe 91. Gas supply pipe 91 is configured to supply the fuel gas to burner 82. Gas supply pipe 91 is provided with a gas valve composed of an electromagnetic valve (not shown), for example.

A spark plug 82a is disposed above burner 82. This spark plug 82a is configured to produce ignition sparks between the spark plug and an ignition target (not shown) provided in burner 82 in response to the actuation of an ignition device (igniter) so as to produce a flame in a fuel air mixture erupted from burner 82. Burner 82 generates heat by combusting the fuel gas supplied from gas supply pipe 91 (hereinafter, it will be called as the combustion operation).

Primary heat exchanger 83 is a sensible heat recovery type heat exchanger. Primary heat exchanger 83 generally includes a plurality of plate-shaped fins 83b, a heat transfer tube 83a that penetrates the plurality of plate-shaped fins 83b, and a case 83c for housing therein the plurality of plate-shaped fins 83b and heat transfer tube 83a. Primary heat exchanger 83 is configured to perform heat exchange with the combustion gas generated by burner 82, specifically it is configured to heat water flowing in heat transfer tube 83a of primary heat exchanger 83 by using the heat generated through the combustion operation of burner 82.

Secondary heat exchanger 84 is a latent heat recovery type heat exchanger. Secondary heat exchanger 84 is located downstream of the flow of the combustion gas than primary heat exchanger 83, and is connected in series to primary heat exchanger 83. Thus, combustion apparatus 80 according to the present embodiment includes secondary heat exchanger 84 of latent heat recovery type, and thereby is a water heater of a latent heat recovery type.

Secondary heat exchanger 84 generally includes a drainage water discharge port 84a, a heat transfer tube 84b, a side wall 84c, a bottom wall 84d, and an upper wall 84g. Heat transfer tube 84b is spirally wound and laminated. Side wall 84c, bottom wall 84d and upper wall 84g are arranged to surround the periphery of heat transfer tube 84b.

In secondary heat exchanger 84, the hot water flowing in heat transfer tube 84b is pre-heated (heated) by the heat exchanged from the combustion gas after it is subjected to heat exchange in primary heat exchanger 83. During the process, as temperature of the combustion gas drops to about 60° C., the water vapor contained in the combustion gas is condensed, which makes it possible to recover the latent heat. After the latent heat is recovered in secondary heat exchanger 84, the water vapor contained in the combustion gas is condensed into drainage water.

Bottom wall 84d serves as a partition between primary heat exchanger 83 and secondary heat exchanger 84, and it also serves as an upper wall of primary heat exchanger 83. An opening 84e is provided on bottom wall 84d. Through the intermediary of opening 84e, the space where heat transfer tube 83a of primary heat exchanger 83 is arranged is brought into communication with the space where heat transfer tubes 84b of secondary heat exchanger 84 is arranged. As indicated by the hollow arrows in FIG. 24, the combustion gas can flow from primary heat exchanger 83 into secondary heat exchanger 84 through opening 84e. In the present embodiment, for the sake of simplification, bottom wall 84d of secondary heat exchanger 84 and the upper wall of primary heat exchanger 83 share a common wall, it is acceptable to have an exhaust collection and guide member connected between primary heat exchanger 83 and secondary heat exchanger 84.

Upper wall 84g is provided with an opening 84h. Through the intermediary of opening 84g, the space where heat transfer tube 84b of secondary heat exchanger 84 is arranged is brought into communication with the internal space of exhaust box 85. As indicated by the hollow arrows in FIG. 24, the combustion gas can flow from secondary heat exchanger 84 into the internal space of exhaust box 85 through opening 84h.

Drainage water discharge port 84a is provided on side wall 84c or bottom wall 84d. This drainage water discharge port 84a is opened at the lowest position (the lowermost position in the vertical direction after the water heater has been installed) in the space surrounded by side wall 84c, bottom wall 84d and upper wall 84g, which is lower than the lower end of heat transfer tube 84b. Accordingly, the drainage water which is produced in secondary heat exchanger 84 can be guided to drainage water discharge port 84a along bottom wall 84d and side wall 84c as indicated by a black arrow in FIG. 24.

Exhaust box 85 constitutes a flow path for the combustion gas between secondary heat exchanger 84 and fan 86. Through the intermediary of exhaust box 85, the combustion gas after the heat exchange with secondary heat exchanger 84 can be guided to fan 86. Exhaust box 85 is mounted on secondary heat exchanger 84, and is positioned downstream of the flow of the combustion gas than secondary heat exchanger 84.

Exhaust box 85 generally includes a box body 85a and a fan connection member 85b. The internal space of box body 85a is in communication with the internal space where heat transfer tubes 84b of secondary heat exchanger 84 is disposed through opening 84h of secondary heat exchanger 84. Fan connection member 85b is provided so as to protrude from the top of box body 85a. This fan connection member 85b has for example a cylindrical shape, and an internal space 85ba thereof is in communication with the internal space of box body 85a.

Fan 86 is configured to suck the combustion gas passed through secondary heat exchanger 84 (subjected to heat exchange with secondary heat exchanger 84) so as to discharge it the outside of combustion apparatus 80. Fan 86 is positioned downstream of the flow of the combustion gas than exhaust box 85 and secondary heat exchanger 84. In other words, in combustion apparatus 80, burner 82, primary heat exchanger 83, secondary heat exchanger 84, exhaust box 85 and fan 86 are arranged in the mentioned order from the upstream to the downstream of the flow of the combustion gas generated by burner 82. As mentioned in the above, since the combustion gas is discharged by fan 86 through suction, combustion apparatus 80 of the present embodiment is a water heater adapted to an exhaust suction and combustion system.

Fan 86 generally includes an impeller 86*a*, a fan case 86*b*, a drive source 86*c*, and a rotation shaft 86*d*. Fan case 86*b* is attached to fan connection member 85*b* of exhaust box 85 so as to communicate the internal space of fan case 86*b* with the internal space of fan connection member 85*b*. As indicated by the hollow arrows in FIG. 24, the combustion gas can be sucked from box body 85*a* of exhaust box 85 into fan case 86*b* through fan connection member 85*b*.

Impeller 86*a* is disposed inside fan case 86*b*. Impeller 86*a* is connected to drive source 86*c* through the intermediary of rotation shaft 86*d*. Thereby, impeller 86*a* is supplied with a driving force from drive source 86*c*, rotatable about rotation shaft 86*d*. Due to the rotation of impeller 86*a*, the combustion gas in exhaust box 85 can be sucked into the inner peripheral space of impeller 86*a* and expelled to the outer peripheral space of impeller 86*a*.

Connection pipe 87 is connected to a region outside the outer peripheral space where impeller 86*a* is disposed among the internal space of fan case 86*b*. Therefore, the combustion gas expelled to the outer peripheral space of impeller 86*a* by impeller 86*a* of fan 86 can be emitted into exhaust tube 20 through connection pipe 87.

As mentioned in the above, the combustion gas produced by burner 82 is sucked into fan 86 due to the rotation of impeller 86*a*, after sequentially passing through primary heat exchanger 83, secondary heat exchanger 84 and exhaust box 85, the combustion gas reaches fan 86 as indicated by the hollow arrows in FIG. 24, it can be discharged to the outside of combustion apparatus 80.

Drainage water tank 88 is configured to accumulate the drainage water generated in secondary heat exchanger 84. Drainage water tank 88 is connected to secondary heat exchanger 84 through pipe 90. Pipe 90 is connected to drainage water discharge port 84*a* of secondary heat exchanger 84, which makes it possible to drain the drainage water generated in secondary heat exchanger 84 into drainage water tank 88. This drainage water tank 88 is further connected with a pipe 95 extending to the outside of combustion apparatus 80. Thus, the drainage water accumulated in drainage water tank 88 can be drained to the outside of combustion apparatus 80 through pipe 95.

Drainage water tank 88 has a water-seal structure. Specifically, drainage water tank 88 has such a structure that after the drainage water is accumulated in drainage water tank 88 to a predetermined amount, the accumulated drainage water prevents air from passing through drainage water tank 88. With the help of the water-seal structure of drainage water tank 88, the air outside combustion apparatus 80 (outside air) can be prevented from passing through drainage water tank 88 via pipe 95 to enter into combustion apparatus 80 (such as secondary heat exchanger 84).

In addition, a lower portion of drainage water tank 88 is connected to a drainage water drain pipe 96, separately from drainage water discharge pipe 95. Drainage water drain pipe 96 (which is normally closed) is configured to be opened for example during maintenance so as to discharge the drainage water which is accumulated in drainage water tank 88. Optionally, the internal space of drainage water tank 88 may be filled with a neutralizing agent (not shown) so as to neutralize the acidic drainage water.

A water supply pipe 92 is connected to one end of heat transfer tube 84*b* of secondary heat exchanger 84, and a hot water delivery pipe 93 is connected to one end of heat transfer tube 83*a* of primary heat exchanger 83. Further, the other end of heat transfer tube 83*a* of primary heat exchanger 83 and the other end of heat transfer tube 84*b* of secondary heat exchanger 84 are connected to each other by a pipe 94. Each of gas supply pipe 91, water supply pipe 92 and hot water delivery pipe 93 mentioned above leads to the outside at a top portion of combustion apparatus 80, for example. In addition, burner 82, primary heat exchanger 83, secondary heat exchanger 84, exhaust box 85, fan 86, drainage water tank 88 and the like are disposed inside housing 89.

Housing 89 includes a connection member 89*a* and an exhaust member 89*b*. Specifically, connection member 89*a* which projects upward in tubular shape and exhaust member 89*b* which projects upward in tubular shape are provided concentrically on the upper surface of housing 89. In other words, connection member 89*a* and exhaust member 89*b* constitute a double pipe structure.

Connection member 89*a* is disposed to surround the outer peripheral surface of exhaust member 89*b*, and is provided with a connection hole in a region inside housing 89 between the outer surface of exhaust member 89*b* and the inner peripheral surface of connection member 89*a*. Further, an exhaust vent is provided in housing 89 inner to exhaust member 89*b*. The connection hole is in communication with the interior of housing 89, and the exhaust vent is in communication with the interior of connection pipe 87. Thereby, the vacancy between the outer peripheral surface of exhaust tube 20 and the inner peripheral surface of connection pipe 60 is brought into communication with the internal space of housing 89 via the connection hole provided in housing 89. Further, the combustion gas after passing through burner 82 is fed from connection pipe 87 into exhaust tube 20 through exhaust member 89*b*.

Connection member 89*a* is connected to connection pipe 60 at one end side of connection pipe 60, and exhaust member 89*b* is connected to exhaust tube 20 at one end 20*a* of exhaust tube 20. Note that exhaust member 89*b* may be also connected to connection pipe 87 which is housed inside housing 89. For example, in the case where exhaust member 89*b* is configured to protrude from the upper surface of housing 89 downward in tubular shape, the connection between exhaust member 89*b* and connection pipe 87 will become easier.

Connection member 89*a* and connection pipe 60 may be connected in such a manner that no gas flowing inside will leak out. Similarly, exhaust member 89*b* and exhaust tube 20 (and connection pipe 87) may be connected in such a manner that no gas flowing inside will leak out. Thus, an O-ring may be interposed between the two connected parts or a binding band may be used to firmly bind the two connected parts. The two parts may be outer attached or inner attached to each other.

Then, the functions and effects of the present embodiment will be described.

According to the exhaust tube holding member of present invention, as illustrated in FIGS. 8 and 9, it is possible to insert exhaust tube 20 into exhaust tube holding hole 1*a* from exhaust tube inserting notch 1*b* which is opened to rim 13. As a result, it is possible to attach exhaust tube holding member 10 to exhaust tube 20 along the radial direction of exhaust tube 20, compared with the case of attaching exhaust tube holding member 10 along the axial direction of exhaust tube 20, it is possible to facilitate the installation.

As illustrated in FIG. 3, in the present embodiment, main body 1 has width WA smaller than width W of exhaust tube inserting notch 1b at boundary portion 6. Thus, once after exhaust tube 20 is inserted into exhaust tube holding hole 1a, exhaust tube 20 is prevented from slipping out from exhaust tube holding hole 1a back to exhaust tube inserting notch 1b.

Furthermore, as illustrated in FIGS. 5 to 7, in the present embodiment, the wall surface defining exhaust tube holding hole 1a is formed with exhaust tube holding projection and recess portions 2, 3 and 4 matching the shape of the outer peripheral surface of exhaust tube 20. As a result, after exhaust tube 20 is inserted into exhaust tube holding hole 1a, exhaust tube holding projection and recess portions 2, 3 and 4 fit the recesses and the projections formed on the outer peripheral surface of exhaust tube 20. Thereby, exhaust tube holding member 10 is prevented from displacing in the axial direction relative to exhaust tube 20.

Furthermore, as illustrated in FIGS. 5 to 7, in the present embodiment, the wall surface defining exhaust tube inserting notch 1b is formed with exhaust tube inserting projection and recess portions 2, 3 and 4 matching the shape of the outer peripheral surface of exhaust tube 20. As a result, when passing exhaust tube 20 through exhaust tube inserting notch 1b, exhaust tube holding member 10 is properly guided in the radial direction of exhaust tube 20 by exhaust tube inserting projection and recess portions 2, 3 and 4. Thereby, it is possible to make the operation of attaching exhaust tube holding member 10 to exhaust tube 20 easier.

In the present embodiment, the exhaust tube inserting projection and recess portions 2, 3 and 4 include recess 4, projection 3 positioned on one side of recess 4, and projection 2 positioned on the other side of recess 4. Since projection 3 extends to the side of rim 13 further than projection 2, when outfitting the opening of exhaust tube inserting notch 1b onto the outer peripheral surface of exhaust tube 20, projection 3 can be placed on a projection formed on the outer peripheral surface of exhaust tube 20. The placement of projection 3 on a projection formed on the outer peripheral surface of exhaust tube 20 allows exhaust tube holding member 10 to be positioned relative to exhaust tube 20 in the axial direction.

Thereafter, by inserting exhaust tube 20 into exhaust tube inserting notch 1a, the projection on the outer peripheral surface of exhaust tube 20 can be sandwiched between projection 2 and projection 3, and thereby held by the same. Thereby, it is possible to attach exhaust tube holding member 10 to exhaust tube 20 while preventing exhaust tube holding member 10 from displacing from exhaust tube 20 in the axial direction, making the operation of attaching exhaust tube holding member 10 to exhaust tube 20 easier.

As illustrated in FIGS. 4 and 7, in the present embodiment, main body 1 is provided with positioning protrusions 7a and 7b protruding from second surface 12. Positioning protrusions 7a and 7b each has a shape in conformity with the shape of upper end opening 30a of exhaust pipe 30. With the help of positioning protrusions 7a and 7b, it is possible to position exhaust tube holding member 10 relative to upper end opening 30a of exhaust pipe 30 and prevent exhaust tube holding member 10 from displacing from upper end opening 30a of exhaust pipe 30.

Further, positioning protrusions 7a and 7b each has an arc shape. As a result, in the case where upper end opening 30a of exhaust pipe 30 is circular, it is possible to match positioning protrusions 7a and 7b with the shape of upper end opening 30a of exhaust pipe 30.

As illustrated in FIG. 4, positioning protrusions 7a and 7b are provided to surround the periphery of exhaust tube holding hole 1a without reaching exhaust tube inserting notch 1b. As a result, when fitting exhaust tube 20 into the opening ends of exhaust tube inserting notch 1b at rim 13, positioning protrusions 7a and 7b are prevented from interfering with upper end opening 30a of exhaust pipe 30. Therefore, it is possible to attach exhaust tube holding member 10 to exhaust tube 20 more smoothly.

As illustrated in FIG. 6, in the present embodiment, main body 1 is provided with reinforcing rib 5 protruding from first surface 11 and extending from exhaust tube holding hole 1a to rim 13. With the help of reinforcing rib 5, it is possible to improve the strength of the outer periphery around exhaust tube holding hole 1a, allowing exhaust tube holding member 10 to hold exhaust tube 20 securely.

In addition, no reinforcing rib is provided around exhaust tube inserting notch 1b. As a result, it is possible to make main body 1 around exhaust tube inserting notch 1b flexible. Therefore, when inserting exhaust tube 20 into exhaust tube inserting notch 1b, main body 1 around exhaust tube inserting notch 1b bends in accordance with the shape of the outer peripheral surface of exhaust tube 20, making the attachment of exhaust tube holding member 10 to exhaust tube 20 easier.

Furthermore, as illustrated in FIG. 3, in the present embodiment, exhaust tube holding hole 1a has a circular shape in planar view (when viewed from the direction orthogonal to first surface 11), and the diameter D of the circular shape is equal to the width W of exhaust tube inserting notch 1b. As a result, it is easy to design exhaust tube holding member 10.

As illustrated in FIG. 2, in the present embodiment, rain cap 70 covers the upper side of exhaust tube holding member 10. Therefore, it is possible to prevent the moisture such as rain water from entering into exhaust pipe 30 through exhaust tube inserting notch 1b of exhaust tube holding member 10.

Rain cap 70 includes exhaust vent (discharge portion) 70a1 for discharging the exhaust gas from combustion device 80. As a result, it is possible to discharge the exhaust gas from combustion device 80 to the outside through exhaust vent 70a1.

Further, rain cap 70 includes cover portions 70b and 70c that cover exhaust tube holding member 10. Since exhaust tube holding member 10 is covered by cover portions 70b and 70c, it is possible to prevent the moisture such as rain water from entering into exhaust pipe 30 through exhaust tube inserting notch 1b of exhaust tube holding member 10.

As illustrated in FIG. 9, in the present embodiment, after exhaust tube holding member 10 is held at the upper end of exhaust pipe 30, exhaust tube inserting notch 1b communicates the internal space of exhaust pipe 30 with the external space of exhaust tube 30. As a result, even if the exhaust gas leaks from the interior of exhaust tube 20 to the outside, it is possible to discharge the exhaust gas from the interior of exhaust pipe 30 through exhaust tube inserting notch 1b to the outside of exhaust pipe 30. Therefore, the exhaust gas is discharged to the outside and is prevented from entering into the room.

It should be noted that exhaust tube fixing member 50 illustrated in FIG. 1 is provided with slits or the like, cool air can be sucked into the interior of exhaust tube fixing member 50 through the slits or the like. The cool air may cause condensation water to occur on the inner surface of exhaust pipe 30. This phenomenon becomes particularly remarkable in cold seasons or cold areas. Therefore, exhaust pipe holding member 10 of the present embodiment is preferred to be incorporated with such a structure that is provided with no slit or the like and cannot suck cool air from the outside. However, in the case where exhaust pipe holding member 10 of the present embodiment is used in warm areas, exhaust tube fixing member 50 may be provided with slits or the like.

As illustrated in FIGS. 13 and 14, blockage plate 110 is inserted into exhaust tube inserting notch 1b of exhaust tube holding member 10. Thereby, it is possible to use blockage plate 110 to block the exhaust tube inserting notch 1b, and it is possible to use exhaust tube holding member 10 to block upper end opening 30a of exhaust pipe 30. Thus, the outside cool air can be prevented from entering exhaust pipe 30 through upper end opening 30a of exhaust pipe 30. As a result, in the case where the outer temperature is low, the outside cool air can be prevented from entering exhaust pipe 30 to generate condensation water on the inner surface of exhaust pipe 30, and thereby preventing the walls and the roof inside the room from getting wet by the condensation water.

As illustrated in FIGS. 13 and 18, on each of exhaust tube holding hole 1a and exhaust tube inserting notch 1b, each cutout 3b is located at the side of first surface 11 with respect to projection strip 2a, and each cutout 2b is located at the side of second surface 12 with respect to projection strip 3a. Thereby, as illustrated in FIG. 19, when molding exhaust tube holding member 10 by using a molding die, it is possible to mold it by using a molding die arranged at the side of first surface 11 and a molding die arranged at the side of second surface 12, making it possible to simplify the design of the molding die.

As illustrated in FIG. 20, each of exhaust tube holding hole 1a and exhaust tube inserting notch 1b is provided with a single projection 3 without any other projection. Accordingly, as illustrated in FIG. 21, when molding exhaust tube holding member 10 by using a molding die, it is possible to mold it by using a molding die arranged at the side of first surface 11 and a molding die arranged at the side of second surface 12, making it possible to simplify the design of the molding die.

As illustrated in FIGS. 15 to 17, main body 1 is provided with positioning recesses 7c and 7d formed on second surface 12 and configured to contact upper end opening 30a of exhaust pipe 30. With the help of positioning recesses 7c and 7d, it is possible to position exhaust tube holding member 10 relative to upper end opening 30a of exhaust pipe 30 and prevent exhaust tube holding member 10 from displacing from upper end opening 30a of exhaust pipe 30.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An exhaust tube holding member for holding an exhaust tube inside an exhaust pipe, said exhaust tube being connected to a combustion apparatus and introduced into said exhaust pipe, said exhaust tube holding member comprising:
   a main body including a first surface and a second surface opposing each other, and a rim surrounding a periphery of said first surface and said second surface,
   said main body being provided with an exhaust tube holding hole and an exhaust tube inserting notch, said exhaust tube holding hole has a circular shape when viewed from a direction orthogonal to the first surface,
   said exhaust tube inserting notch reaches said rim by extending in a radial direction of said exhaust tube holding hole, and said exhaust tube holding member comprises a boundary portion between said exhaust tube holding hole and said exhaust tube inserting notch, the boundary portion has a width smaller than the width of said exhaust tube inserting notch when viewed from a direction orthogonal to said first surface,
   said exhaust tube holding hole being configured to penetrate said main body from said first surface to said second surface,
   said exhaust tube inserting notch being configured to penetrate said main body from said first surface to said second surface and extend from said exhaust tube holding hole to said rim, wherein
   the exhaust tube is a flexible tube,
   an exhaust tube holding projection and recess portion matching the shape of the outer peripheral surface of said exhaust tube is formed on a wall surface defining said exhaust tube holding hole, and
   an exhaust tube inserting projection and recess portion matching the shape of the outer peripheral surface of said exhaust tube is formed on a wall surface defining said exhaust tube inserting notch.

2. The exhaust tube holding member according to claim 1, wherein
   said exhaust tube holding projection and recess portion includes a holding recess part, a first holding projection part positioned at one side of said holding recess part, and a second holding projection part positioned at the other side of said holding recess part,
   said first holding projection part is divided by a plurality of first cutouts into a plurality of first projection strips, and said second holding projection part is divided by a plurality of second cutouts into a plurality of second projection strips,
   each second cutout is located at the other side of each of the plurality of first projection strips, and each first cutout is located at the one side of each of the plurality of second projection strips,
   said exhaust tube inserting projection and recess portion includes an inserting recess part, a first inserting projection part positioned at one side of said inserting recess part, and a second inserting projection part positioned at the other side of said inserting recess part,
   said first inserting projection part is divided by a plurality of third cutouts into a plurality of third projection strips, and said second inserting projection part is divided by a plurality of fourth cutouts into a plurality of fourth projection strips, and
   each fourth cutout is located at the other side of each of the plurality of third projection strips, and each third cutout is located at the one side of each of the plurality of fourth projection strips.

3. The exhaust tube holding member according to claim 1, wherein
   said exhaust tube holding projection and recess portion includes a holding recess part, and a holding projection part positioned at one side of said holding recess part,
   said exhaust tube inserting projection and recess portion includes an inserting recess part, and an inserting projection part positioned at one side of said inserting recess part, said exhaust tube holding projection and recess portion includes no other projection part except said single holding projection part, and said exhaust tube inserting projection and recess portion includes no other projection part except said single inserting projection part.

4. The exhaust tube holding member according to claim 1, wherein an exhaust tube inserting projection and recess portion matching the shape of the outer peripheral surface of said exhaust tube is formed on a wall surface defining said exhaust tube inserting notch.

5. The exhaust tube holding member according to claim 4, wherein said exhaust tube inserting projection and recess portion includes an inserting part, a first inserting projection part positioned on one side of said inserting recess part, and a second inserting projection part positioned on the other side of said inserting recess part, and said first inserting projection part extends to the side of said rim further than said second inserting projection part.

6. The exhaust tube holding member according to claim 1, wherein said main body is provided with a positioning protrusion protruding from said second surface in conformity with the shape of an upper end opening of said exhaust pipe.

7. The exhaust tube holding member according to claim 6, wherein said positioning protrusion has an arc shape.

8. The exhaust tube holding member according to claim 6, wherein said positioning protrusion is provided to surround the periphery of said exhaust tube holding hole without reaching said exhaust tube inserting notch.

9. The exhaust tube holding member according to claim 1, wherein said main body is provided with a positioning recess arranged on said second surface and configured to contact the upper end opening of said exhaust pipe.

10. The exhaust tube holding member according to claim 1, wherein said main body is provided with a reinforcing rib protruding from said first surface and extending from said exhaust tube holding hole to said rim.

11. The exhaust tube holding member according to claim 1, wherein said exhaust tube holding hole has a circular shape when viewed from a direction orthogonal to said first surface, and the width of said exhaust tube inserting notch is equal to the diameter of said exhaust tube holding hole.

12. The exhaust tube holding member according to claim 1, further comprising a blockage plate configured to be held by said main body after being inserted into said exhaust tube inserting notch.

13. An exhaust structure for combustion apparatus, comprising:

an exhaust tube holding member according to claim 1;

said exhaust tube which has one end and the other end and is connected to said combustion apparatus at said one end;

said exhaust pipe into which said exhaust tube is introduced; and a rain cap connected to the other end of said exhaust tube and configured to cover the upper side of said exhaust tube holding member, said exhaust tube holding member being attached to the outer peripheral surface of said exhaust tube and held at the upper end of said exhaust pipe.

14. The exhaust structure for combustion apparatus according to claim 13, wherein said rain cap includes a discharge portion for discharging exhaust gas from said combustion apparatus to the outside and a cover portion for covering said exhaust tube holding member, said cover portion includes a ceiling having a larger outer diameter than said exhaust tube holding member and a peripheral wall extending from said ceiling lower than said exhaust tube holding member.

15. The exhaust structure for combustion apparatus according to claim 13, wherein said exhaust tube inserting notch communicates an internal space of said exhaust pipe with an external space of said exhaust pipe in a state where said exhaust tube holding member is attached to said exhaust pipe.

16. A method for installing an exhaust structure for combustion apparatus by using the exhaust tube holding member according to claim 1, comprising the steps of:

connecting said exhaust tube which has one end and the other end to said combustion apparatus at said one end, and pulling the other end of said exhaust tube through said exhaust pipe out of an upper end opening of said exhaust pipe;

attaching said exhaust tube holding member to the outer peripheral surface of said exhaust tube protruding from said upper end opening of said exhaust pipe along the radial direction of said exhaust tube so as to insert said exhaust tube into said exhaust tube holding hole through said exhaust tube inserting notch of said exhaust tube holding member; and holding said exhaust tube holding member which has been attached to the outer peripheral surface of said exhaust tube against said upper end opening of said exhaust pipe.

* * * * *